United States Patent
Katare et al.

(10) Patent No.: US 9,804,305 B2
(45) Date of Patent: Oct. 31, 2017

(54) METHODS FOR SEALING THE EDGES OF MULTI-LAYER ARTICLES

(71) Applicant: 3M INNOVATIVE PROPERTIES COMPANY, St. Paul, MN (US)

(72) Inventors: Rajesh K. Katare, Cottage Grove, MN (US); Eric M. Peterson, St. Paul, MN (US); Sierra V. Schmidt, Belle Plaine, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 64 days.

(21) Appl. No.: 14/375,029

(22) PCT Filed: Jan. 22, 2013

(86) PCT No.: PCT/US2013/022452
§ 371 (c)(1),
(2) Date: Jul. 28, 2014

(87) PCT Pub. No.: WO2013/116032
PCT Pub. Date: Aug. 8, 2013

(65) Prior Publication Data
US 2014/0377511 A1      Dec. 25, 2014

Related U.S. Application Data

(60) Provisional application No. 61/592,680, filed on Jan. 31, 2012.

(51) Int. Cl.
*B32B 17/00*      (2006.01)
*G02B 5/08*       (2006.01)
(Continued)

(52) U.S. Cl.
CPC ........ *G02B 5/0808* (2013.01); *B32B 37/0076* (2013.01); *B32B 2327/12* (2013.01);
(Continued)

(58) Field of Classification Search
CPC ...................................................... B32B 17/00
See application file for complete search history.

(56) References Cited

U.S. PATENT DOCUMENTS

| 4,046,951 | A | 9/1977 | Stefanik |
| 4,547,432 | A | 10/1985 | Pitts |

(Continued)

FOREIGN PATENT DOCUMENTS

| EP | 0349232 | 1/1990 |
| GB | 2042761 | 9/1980 |

(Continued)

OTHER PUBLICATIONS

International Search Report for PCT International Application No. PCT/US2013/022452, mailed on May 16, 2013, 3pgs.

*Primary Examiner* — Cachet Sellman
(74) *Attorney, Agent, or Firm* — Jeffrey M. Olofson

(57) ABSTRACT

Methods for preparing edge-sealed multi-layer film articles include applying a sealant composition to a multi-layer film article that includes at least one polymeric film layer, and permitting the sealant composition to dry to form an edge-sealed article. The sealant composition includes at least one solvent capable of softening, penetrating or dissolving the polymeric film layer of the multi-layer film article, and at least one polymer dissolved in the solvent. The polymer dissolved in the solvent may be a fluoropolymer, a non-tacky at ambient temperatures(meth)acrylate-based block copolymer, or a combination thereof. Edge-sealed articles prepared by this method can include other polymeric film layers or coated layers such as metallic layers and can be part of larger assemblies.

9 Claims, 1 Drawing Sheet

(51) Int. Cl.
  *B32B 37/00*  (2006.01)
  *F24J 2/10*  (2006.01)
(52) U.S. Cl.
  CPC ......... *B32B 2333/08* (2013.01); *F24J 2/1057* (2013.01); *Y10T 428/24777* (2015.01)

(56) References Cited

U.S. PATENT DOCUMENTS

| | | | |
|---|---|---|---|
| 5,122,403 A * | 6/1992 | Roginski | B32B 17/10036 156/107 |
| 5,361,172 A | 11/1994 | Schissel | |
| 5,825,543 A | 10/1998 | Ouderkirk | |
| 5,828,488 A | 10/1998 | Ouderkirk | |
| 5,867,316 A | 2/1999 | Carlson | |
| 5,882,774 A | 3/1999 | Jonza | |
| 6,179,948 B1 | 1/2001 | Merrill | |
| 6,294,233 B1 | 9/2001 | Barth | |
| 6,352,761 B1 | 3/2002 | Hebrink | |
| 6,368,699 B1 | 4/2002 | Gilbert | |
| 6,630,554 B1 | 10/2003 | Hamada | |
| 6,734,256 B1 | 5/2004 | Everaerts | |
| 6,806,320 B2 | 10/2004 | Everaerts | |
| 6,827,886 B2 | 12/2004 | Neavin | |
| 6,927,900 B2 | 8/2005 | Liu | |
| 6,972,813 B1 | 12/2005 | Toyooka | |
| 6,984,114 B2 | 1/2006 | Zili | |
| 6,991,695 B2 | 1/2006 | Tait | |
| 7,084,209 B2 | 8/2006 | Everaerts | |
| 7,255,920 B2 | 8/2007 | Everaerts | |
| 7,343,913 B2 | 3/2008 | Niedermeyer | |
| 2006/0084780 A1 | 4/2006 | Hebrink | |
| 2006/0216524 A1 | 9/2006 | Klun | |
| 2006/0226561 A1 | 10/2006 | Merrill | |
| 2007/0047080 A1 | 3/2007 | Stover | |
| 2008/0011419 A1* | 1/2008 | Everaerts | B32B 7/06 156/332 |
| 2009/0101195 A1 | 4/2009 | Reynolds | |
| 2010/0112454 A1* | 5/2010 | Visco | H01B 1/122 429/246 |
| 2010/0186336 A1 | 7/2010 | Valente | |

FOREIGN PATENT DOCUMENTS

| | | |
|---|---|---|
| JP | 11-302617 | 11/1999 |
| JP | 11-323072 | 11/1999 |
| WO | WO 95-17303 | 6/1995 |
| WO | WO 95-17691 | 6/1995 |
| WO | WO 95-17692 | 6/1995 |
| WO | WO 95-17699 | 6/1995 |
| WO | WO 96-19347 | 6/1996 |
| WO | WO 97-01440 | 1/1997 |
| WO | WO 99-36248 | 7/1999 |
| WO | WO 99-36262 | 7/1999 |
| WO | WO 00-06512 | 2/2000 |
| WO | WO 03-022578 | 3/2003 |
| WO | WO 2004-114419 | 12/2004 |
| WO | WO 2007-076282 | 7/2007 |
| WO | WO 2009-080741 | 7/2009 |
| WO | WO 2009-146227 | 12/2009 |
| WO | WO 2011-028742 | 3/2011 |
| WO | WO 2012-061211 | 5/2012 |
| WO | WO 2013-019463 | 2/2013 |
| WO | WO 2013-019466 | 2/2013 |
| WO | WO 2013-019472 | 2/2013 |
| WO | WO 2013-019695 | 2/2013 |
| WO | WO 2013-019698 | 2/2013 |
| WO | WO 2013-019763 | 2/2013 |
| WO | WO 2013-115977 | 8/2013 |
| WO | WO 2013-166105 | 11/2013 |

* cited by examiner

METHODS FOR SEALING THE EDGES OF MULTI-LAYER ARTICLES

CROSS REFERENCE TO RELATED APPLICATIONS

This application is a national stage filing under 35 U.S.C. 371 of PCT/US2013/022452, filed Jan. 22, 2013, which claims priority to US Provisional Application No. 61/592680, filed Jan. 31, 2012, the disclosure of which is incorporated by reference in its/their entirety herein.

FIELD OF THE DISCLOSURE

The disclosure relates to methods for sealing the edges of multi-layer articles and edge-sealed multi-layer articles.

BACKGROUND

A wide variety of multi-layer articles are made and used for a wide variety of purposes. Some of these articles are exposed to environments that can be problematic for these articles. For example, some articles are exposed to the outside environment and thus exposed to water (rain, fog, mist, dew, etc), variations in temperature (both hot and cold), winds, and contaminants such as dirt, salts, oils and the like. This exposure can cause issues such as delamination of layers. In delamination, one or more layers becomes or begins to become detached from an adjacent layer. Once this process starts it can rapidly expand and cause a catastrophic failure of the article.

To prevent delamination, a variety of articles and techniques have been used to seal the edges of the articles, including the use of heat sealing and use of tapes that overlay the edges.

The PCT Publication No. WO 2009/080741 (Ventelon at al.) describes a solar energy reflector that comprises a mirror with no copper layer, that is laminated to a supporting sheet by means of a bonding material. The edges of the mirror are provided, at least on a portion forming the major part of their height and closest to the metallic sheet, with an edge protection made of a material comprising silicone, polyurethane and/or acrylic, where the material forming the edge protection is different from the bonding material.

The UK Patent Application No. GB 2,042,761 (Sadoune, et al.) describes a flexible radiant energy reflector in the form of a laminate comprising a glass ply bonded by means of bonding layer to a metal ply. The glass may be silvered on its unexposed surface. The flexible reflector may be mounted so that its curvature is fixed and held by a holding device comprising a frame with a rebate groove which receives opposed edges of the curved laminate.

The PCT Publication No. WO 2011/028742 (Molnar et al.) describes a concentrating solar mirror panel assembly having a reflective sheet and a corrugated stiffener having ridges and troughs. The concentrating solar mirror panel assembly may also have end-caps enveloping the two opposing edges of the concentrating solar mirror assembly. The end-caps typically are made of the same material as the corrugated stiffener.

U.S. Pat. No. 4,547,432 (Pitts et al.) described a method for adhering silver to a glass substrate for producing mirrors. This disclosure also includes encapsulated mirrors.

The PCT Publication No. WO 2007/076282 (Jorgensen et al.) describes a silver mirror construction that maintains a high percentage of hemispherical reflectance, wherein the mirrors are characterized by substantially improved optical durability and superior resistance to tunneling or delamination failure under outdoor environmental conditions. The mirrors comprise a) a pressure sensitive adhesive layer positioned beneath a silver overlay, b) a polymer film disposed on the silver overlay, c) an adhesive layer positioned on the polymer film, and d) a UV screening acrylic film disposed on the adhesive layer.

Edge protected barrier assembly films are described in a series of pending patent applications: U.S. Patent Ser. No. 61/515,021 titled "Edge Protected Barrier Assemblies" filed Aug. 4, 2011 and describes multi-layer films comprising a barrier stack adjacent an electronic device and a weatherable sheet adjacent the barrier stack; U.S. Patent Ser. No. 61/515,028 titled "Barrier Assemblies" filed Aug. 4, 2011 and describes multi-layer films comprising a barrier stack adjacent an electronic device and a weatherable sheet adjacent the barrier stack; U.S. Patent Ser. No. 61/515,043 titled "Edge Protected Barrier Assemblies" filed Aug. 4, 2011 and describes multi-layer films comprising a barrier stack adjacent an electronic device, a weatherable sheet adjacent the barrier stack, and a protective layer in contact with the electronic device and the weatherable sheet; and U.S. Patent Ser. No. 61/515,073 titled "Edge Protected Barrier Assemblies" filed Aug. 4, 2011 and describes multi-layer films comprising a barrier stack adjacent an electronic device, a weatherable sheet adjacent the barrier stack, and an opaque protective layer in contact with the electronic device and the weatherable sheet. Additionally, there are two pending patent applications relating to methods for preparing multi-layer articles with edge seals. U.S. Patent Ser. No. 61/515,079 titled "Edge Protected Barrier Assemblies" filed Aug. 4, 2011 and describes an assembly comprising an electronic device, and a multi-layer film. The multi-layer film comprises a substrate adjacent the electronic device, a barrier stack adjacent the substrate opposite the electronic device, and a weatherable sheet adjacent the barrier stack opposite the substrate. The multi-layer film has been fused. U.S. Patent Ser. No. 61/515,083 titled "Method of Making Delamination Resistant Assemblies" filed Aug. 4, 2011 and describes a method of reducing delamination in an assembly. The method comprises providing an assembly and limiting visible light exposure to parts of the assembly to maintain a peel force of 20 grams/inch or greater where the light is limited. The assembly comprises an electronic device, a substrate having a first surface and a second surface opposite the first surface, wherein the second surface of the substrate is disposed on the electronic device, a barrier stack disposed on the first surface of the substrate, and a weatherable sheet adjacent the barrier film opposite the substrate. The assembly is transmissive to visible and infrared light.

SUMMARY

Disclosed herein are methods for preparing edge-sealed multi-layer film articles. Also disclosed are a variety of edge-sealed multi-layer film articles that may include both polymeric film layers and non-polymeric film layers. The methods for preparing articles comprise providing a multi-layer film article comprising at least one polymeric film layer and having an edge, providing a sealant composition, applying the sealant composition to at least a portion of the of the edge of the multi-layer film article, and permitting the sealant composition to dry to form an edge-sealed article. The sealant composition comprises at least one solvent capable of softening, penetrating or dissolving the at least one polymeric film layer of the multi-layer film article, and at least one polymer dissolved in the solvent. The polymer dissolved in the solvent may comprise a fluoropolymer, a non-tacky at ambient temperatures (meth)acrylate-based block copolymer, or a combination thereof.

Among the articles of this disclosure are articles comprising a multi-layer substrate with at least one edge comprising at least one transparent polymeric film layer, and at least one metallic layer, wherein at least a portion of the edge of the multi-layer substrate is edge sealed. The edge seal generally comprises a layer of edge sealant material completely encompassing the edge. The edge sealant material comprises a fluoropolymer, a non-tacky at ambient temperatures (meth)acrylate-based block copolymer, or a combination thereof.

Other articles of this disclosure comprise a multi-layer substrate with at least one edge comprising at least two transparent polymeric film layers, wherein the edge of the multi-layer substrate comprises a layer of edge sealant material completely encompassing the edge. The edge sealant material comprises a fluorinated polymer, a non-tacky at ambient temperature (meth)acrylate-based block copolymer, or a combination thereof.

BRIEF DESCRIPTION OF THE DRAWINGS

The present application may be more completely understood in consideration of the following detailed description of various embodiments of the disclosure in connection with the accompanying drawings.

Figure 1:
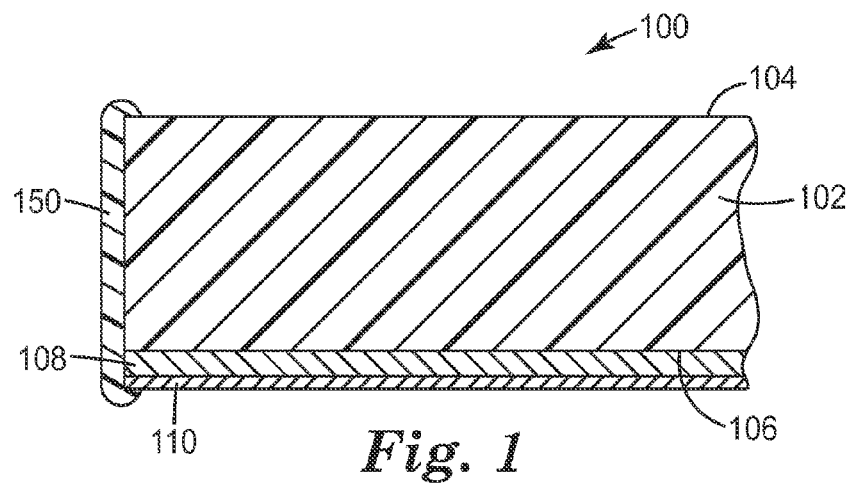
FIG. 1 shows a cross sectional view showing layers of a reflective article according to one embodiment of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

A wide range of multi-layer articles have been developed. Edge delamination is a concern for these multi-layer articles. Even slight edge delamination can be problematic because once delamination begins at the edge, it may grow rapidly and can cause catastrophic failure of the entire multi-layer article. This is particularly true for multi-layer articles that are exposed to the elements. For example, moisture can penetrate the multi-layer article at the edge, wind may cause the start of edge delamination, or thermal stress may cause a separation to start at the edge.

Many multi-layer articles contain layers that are polymeric materials (such as films, coatings and layers or pressure sensitive adhesives, for example) and some also many contain layers that are not polymeric materials. Examples of non-polymeric materials that may be included in multi-layer articles include layers of glass, metals and metal oxides.

A variety of techniques have been used to provide edge sealing of multi-layer articles. The use of heat to seal the edge is one such technique. While this has proven successful in some instances, it requires specialized equipment and may not be easily used away from the factory environment. For example, if the multi-layer article is a window film that is cut to fit at the job site, it may not be practical to use heat sealing equipment to seal the cut edges of the multi-layer articles.

Other edge-sealing techniques include the application of tapes or sealant layers. Examples of sealant layers include caulks which may be applied as a moisture curing liquid or gel, hot melt coated materials, pre-formed gaskets, and the like. Each of these techniques also has its drawbacks. One major issue can be that the application of these external materials to the multi-layer article can produce stress within the multi-layer article. This is particularly true if the multi-layer article contains relatively fragile layers such as very thin metal or metal oxide layers. Thus, the edge sealing techniques may help to prevent edge delamination but can cause other forms of failure or delamination within the multi-layer article. Additionally, these types of sealant layers can be aesthetically unpleasing and, like the heat sealing technique described above, can be difficult and time consuming to apply, especially at job sites.

In this disclosure, methods are presented for edge-sealing a wide variety of multi-layer articles. The edge-sealing techniques do not have the drawbacks described above and may be practiced in a factory environment or at a job site where the multi-layer article is being used.

The methods include providing a multi-layer film article comprising at least one polymeric film layer and having an edge and applying a sealant composition to at least a portion of the edge of the multi-layer film article. The sealant composition comprises a solvent capable of softening, penetrating or dissolving the at least one polymeric film layer of the multi-layer film article. Generally, the sealant composition additionally comprises at least one polymer dissolved in the solvent. The applied sealant composition is permitted to dry to form the edge-sealed article. In some embodiments, the sealed edge comprises a layer of edge sealant encompassing at least a portion of the edge. In some embodiments, the edge comprises one or more perimeter edges. In other embodiments, the edge comprises a cut, slit or hole formed in the multi-layer film article.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The terms "ambient temperature" and "room temperature" are used interchangeably and refer to a temperature in the range of 20° C. to 25° C.

The term "edge" as used herein refers to a segment of a multi-layer film article where the ends of all or at least a majority of the layers are open to the environment. The term edge may include one or more perimeter edges as well as edges that can be formed in the multi-layer film article by, for example, cutting, slitting, hole punching, etc.

The term "edge-sealed" as used herein, means that at least one of the edges of an article is sealed. Additional edges (including all of the edges) may also be sealed, but they are not required to be sealed.

The terms "polymer" and "polymeric" as used herein refer to organic macromolecules. These macromolecules include homopolymers and copolymers, as well as polymers or copolymers that may be formed in a miscible blend, for example, by co-extrusion or by reaction, including transesterification. The terms "polymer" and "copolymer" include both random and block copolymers.

The term "block copolymer" as used herein refers to a polymeric material that includes a plurality of distinct polymeric segments (or "blocks") that are covalently bonded to each other. A block copolymer includes (at least) two different polymeric blocks, commonly referred to as the A block and the B block. The A block and the B block generally have chemically dissimilar compositions with different glass transition temperatures. Each A block and B block may be a homopolymeric block or a copolymeric block. Typically each block is a homopolymeric block. An example of a block copolymer is an "ABA" triblock copolymer that has a pair of A endblocks covalently coupled to a B midblock. As used herein, the term "endblock" refers to the terminal segments of the block copolymer and the term "midblock" refers to the central segment of the block copolymer. The terms "A block" and "A endblock" are used interchangeably herein. Likewise, the terms "B block" and "B midblock" are used interchangeably herein. Another example of a block copolymer are "star block" copolymers. Star block copolymers have at least two A blocks and a least one B block and are described with the formula $(A-B)_n$. Star block copolymers often have a central region from which various branches extend. In these cases, the B blocks are typically in the central regions and the A blocks are in the terminal regions of the star block copolymers.

The terms "glass transition temperature" and "Tg" are used interchangeably and refer to the glass transition temperature of a polymer, polymer block or polymer mixture. The glass transition temperature is the temperature at which a polymeric material undergoes a transition from a glassy state to a rubbery state. The glassy state is typically associated with a material that is, for example, brittle, stiff, rigid, or a combination thereof. In contrast, the rubbery state is typically associated with a material that is flexible and/or elastomeric. The glass transition temperature can be determined using methods such as Differential Scanning calorimetry (DSC) or Dynamic Mechanical Analysis (DMA).

The term "(meth)acrylate" refers to monomeric acrylic or methacrylic esters of alcohols. Acrylate and methacrylate monomers or oligomers are referred to collectively herein as "(meth)acrylates". Polymers described as "(meth)acrylate-based" are polymers or copolymers prepared primarily (greater than 50% by weight) from (meth)acrylate monomers and may include additional ethylenically unsaturated monomers.

The term "ethylenically unsaturated" as used herein, refers to monomers or other polymerizable molecules that contain a terminal carbon-carbon double bond capable of polymerizing via a free radical polymerization reaction. Examples of ethylenically unsaturated monomers include (meth)acrylates, styrenes, vinyl esters, and the like. Monomers that described as "monoethylenically unsaturated" contain on average only one terminal carbon-carbon double bond.

The term "fluoropolymer" as used herein refers to polymers where at least some of the hydrogen atoms have been replaced by fluorine atoms. In some instances, all or essentially all of the hydrogen atoms on a polymer are replaced by fluorine atoms, sometimes these polymers are referred to as "perfluorinated polymers".

Unless otherwise indicated, "optically transparent" refers to an article, film or adhesive composition that has a high light transmittance over at least a portion of the visible light spectrum (about 400 to about 700 nm). The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

Unless otherwise indicated, "optically clear" refers to an adhesive or article that has a high light transmittance over at least a portion of the visible light spectrum (about 400 to about 700 nm), and that exhibits low haze.

The term "adjacent" as used herein when referring to two layers means that the two layers are in proximity with one another with no intervening open space between them. They may be in direct contact with one another (e.g. laminated together) or there may be intervening layers. Examples of two layers disposed on a substrate where layer 1 and layer 2 are adjacent include the configurations: substrate/layer 1/layer 2; and layer 1/substrate/layer 2.

The term "back plate" as used herein, refers to a rigid or semi-rigid substrate to which an article, such as a mirror film, is attached to provide support and shape to the article. An example of a suitable back plate is a polymethylmethacrylate (PMMA) plate. Similarly, the term "front plate" as used herein, refers to a rigid or semi-rigid substrate that may be attached to the front surface of an article, such as a mirror film, to provide protection for the article as well as to provide support and shape. An example of a suitable front plate is a glass plate. In some embodiments, the back plate and/or the front plate is attached to the article by an adhesive, such as a pressure sensitive adhesive. As used herein, the term "pressure sensitive adhesive" refers to an adhesive that exhibits aggressive and persistent tack at room temperature, adhesion to a substrate with no more than finger pressure, sufficient ability to hold onto an adherend, and sufficient cohesive strength to be removable from the substrate.

Disclosed herein are methods for preparing articles that comprise providing a multi-layer film article comprising at least one polymeric film layer and having an edge, providing a sealant composition, applying the sealant composition to at least a portion of the edge of the multi-layer film article, and permitting the sealant composition to dry to form an edge-sealed article. The sealant composition comprises at least one solvent capable of softening, penetrating or dissolving the at least one polymeric film layer of the multi-layer film article. Depending upon the nature of the multi-layer article, the solvent may also be capable of softening, penetrating or dissolving more than one polymeric film layer of the multi-layer film article. In some embodiments the solvent is capable of penetrating and at least partially dissolving the at least one polymeric film layer of the multi-layer film article. This permits, upon drying, the edges of the multi-layer article to which the solvent was applied to become edge sealed. While not wishing to be bound by theory, it is believed that the edge sealing can be achieved by a covering of the edge by the softened and reformed polymer layer to form the edge seal, or, in some embodiments, if multiple polymer layers are present, the multiple polymer layers can become fused together to form the edge seal. Generally, in addition to the solvent, the sealant composition also comprises at least one polymer dissolved in the solvent. In these embodiments, upon drying the dissolved polymer forms a layer of edge sealant material that encompasses at least a portion of the edge.

In some embodiments, the edge comprises at least one perimeter edge. In some embodiments, it comprises two or more perimeter edges. In yet other embodiments, the edge comprises a formed edge. The formed edge can be formed by, for example, cutting, slitting, or hole punching. Formed edges may be particularly useful for multi-layer film articles that have been applied to substrates and have begun to show corrosion or other delamination issues. The multi-layer article can be repaired by cutting an edge into the film beyond the portion of the article where the delamination issues have occurred, the newly formed edge can then be sealed using the methods of this disclosure.

In some embodiments, the method of forming an edge-sealed multi-layer article may also comprise the application of a solvent pre-treatment applied to at least a portion of the edge. This solvent pre-treatment is done prior to the application of the sealant composition. Examples of suitable solvents include ketones, alcohols, halocarbons, hydrocarbons, aromatics and esters. Typically, the solvent pre-treatment comprises a ketone or an alcohol. Suitable ketones include acetone and methyl ethyl ketone (MEK); suitable alcohols include methanol, ethanol, isopropanol, and butanol. The use of a pre-treatment is not required, but the solvent pre-treatment can help prepare the surface of the edge for the sealant composition.

Additionally, in some embodiments it may be desirable to form a second edge seal. The second edge seal can encompass the first edge seal and may additionally encompass other layers or articles. For example an edge-sealed multi-layer article may be used as a protective cover for an electronic or display device. The edge-sealed multi-layer article may be placed such that at least one edge of the electronic or display device is proximate to the sealed edge of the multi-layer article. An edge sealant composition can be applied to this newly formed edge and allowed to dry to form the second edge seal.

A wide variety of multi-layer film articles are suitable for use with the disclosed edge sealing method. The multi-layer film articles comprise at least two layers with one of the layers being a polymeric film layer. The multi-layer film articles may include a wide variety of additional layers. In some embodiments, the additional layers are also polymeric film layers. In other embodiments, the additional layers may include a layer or layers that are not films including, for example, pressure sensitive adhesive layers and layers that may best be described as coatings, such as metallic layers, metal oxide layers.

Examples of suitable multi-layer film articles include the wide range of multi-layer optical films and the barrier assembly films described in a series of pending patent applications: U.S. Patent Ser. No. 61/515,021 titled "Edge Protected Barrier Assemblies" filed Aug. 4, 2011 and describes multi-layer films comprising a barrier stack adjacent an electronic device and a weatherable sheet adjacent the barrier stack; U.S. Patent Ser. No. 61/515,028 titled "Barrier Assemblies" filed Aug. 4, 2011 and describes multi-layer films comprising a barrier stack adjacent an electronic device and a weatherable sheet adjacent the barrier stack; U.S. Patent Ser. No. 61/515,043 titled "Edge Protected Barrier Assemblies" filed Aug. 4, 2011 and describes multi-layer films comprising a barrier stack adjacent an electronic device, a weatherable sheet adjacent the barrier stack, and a protective layer in contact with the electronic device and the weatherable sheet; and U.S. Patent Ser. No. 61/515,073 titled "Edge Protected Barrier Assemblies" filed Aug. 4, 2011 and describes multi-layer films comprising a barrier stack adjacent an electronic device, a weatherable sheet adjacent the barrier stack, and an opaque protective layer in contact with the electronic device and the weatherable sheet.

Multi-layer optical films are suitable for use in optical applications. Useful multi-layer optical films are designed to control the flow of light. They may have a transmission of greater than about 90%, and a haze value of less than about 5%, for example, less than 2%, or less than 1%. Properties to consider when selecting a suitable multi-layer optical film include mechanical properties such as flexibility, dimensional stability, self-supportability, and impact resistance. For example, the multi-layer optical film may need to be structurally strong enough so that the article can be assembled as part of a display device.

The multi-layer optical film may be used in a wide variety of applications such as graphic arts and optical applications. A useful multi-layer optical film may be described as a reflective film, a polarizer film, a reflective polarizer film, a diffuse blend reflective polarizer film, a diffuser film, a brightness enhancing film, a turning film, a mirror film, or a combination thereof. The multi-layer optical film may have ten or less layers, hundreds, or even thousands of layers, the layers being composed of some combination of all birefringent optical layers, some birefringent optical layers, or all isotropic optical layers. In one embodiment, the multi-layer optical film has alternating layers of first and second optical layers, wherein the first and second optical layers have refractive indices along at least one axis that differ by at least 0.04. Multi-layer optical films having refractive index mismatches are described in the references cited below. In another embodiment, the multi-layer optical film may comprise one or more layers of any of the above multi-layer optical films such that the primer layer is buried in any one of them, making the article itself a reflective film, a polarizer film, a reflective polarizer film, a diffuse blend reflective polarizer film, a diffuser film, a brightness enhancing film, a turning film, a mirror film, or a combination thereof.

Useful multi-layer optical films include commercially available optical films marketed as VIKUITI Dual Brightness Enhanced Film (DBEF), VIKUITI Brightness Enhanced Film (BEF), VIKUITI Diffuse Reflective Polarizer Film (DRPF), VIKUITI Enhanced Specular Reflector (ESR), and VIKUITI Advanced Polarizing Film (APF), all available from 3M Company, St. Paul, Minn. Useful optical films are also described in U.S. Pat. Nos. 5,825,543; 5,828,488 (Ouderkirk et al); U.S. Pat. Nos. 5,867,316; 5,882,774; 6,179,948 B1 (Merrill et al); U.S. Pat. Nos. 6,352,761 B1; 6,368,699 B1; 6,927,900 B2; 6,827,886 (Neavin et al.); U.S. Pat. No. 6,972,813 B1 (Toyooka); U.S. Pat. No. 6,991,695; 2006/0084780 A1 (Hebrink et al.); 2006/0216524 A1; 2006/0226561 A1 (Merrill et al.); 2007/0047080 A1 (Stover et al.); WO 95/17303; WO 95/17691; WO95/17692; WO 95/17699; WO 96/19347; WO 97/01440; WO 99/36248; and WO99/36262. These multi-layer optical films are merely illustrative and are not meant to be an exhaustive list of suitable multi-layer optical films that can be used.

At least one layer of the multi-layer film article comprises a polymer film. This film is an optically transparent film and may be prepared from a variety of materials. The film may comprise a single polymeric material or may be prepared from a mixture of polymeric materials. Examples of suitable materials include polyesters such as polyethylene terephthalate, polyethylene naphthalate, copolyesters or polyester blends based on naphthalene dicarboxylic acids; polycarbonates; polystyrenes; styrene-acrylonitriles; cellulose acetates; polyether sulfones; poly(meth)acrylates such as polymethylmethacrylate; polyurethanes; polyvinyl chloride; polycyclo-olefins; polyimides; or combinations or blends thereof.

Examples of multi-layer film articles that are suitable for use with the edge sealing method of this disclosure are the reflective articles described in the pending U.S. Patent Application Ser. No. 61/409,210 titled "Reflective Articles and Methods of Making Same" filed on Nov. 2, 2010. The reflective articles comprise a base layer having a first and second surface, and a metallic layer extending across at least a portion of the second surface. The reflective article may also comprise a top layer comprising poly methylmethacrylate in contact with the first surface of the base layer, and may also comprise a tie layer comprising a metal oxide located between the base layer and the metallic layer.

The base layer is non-tacky at ambient temperatures and comprises a random copolymer or a block copolymer with at least two endblock polymeric units that are each derived from a first monoethylenically unsaturated monomer comprising a methacrylate, acrylate, styrene, or combination thereof, wherein each endblock has a glass transition temperature of at least 50° C., and at least one midblock polymeric unit that is derived from a second monoethylenically unsaturated monomer comprising a methacrylate, acrylate, vinyl ester, or combination thereof, wherein each midblock has a glass transition temperature no greater than 20° C. The base layer may also comprise additives such as ultraviolet light absorber or a nanofiller to adjust the modulus of the base layer. Typically, the base layer has a thickness of at least 10 micrometers but no greater than 200 micrometers.

The reflective articles comprise one or more metallic layers. Besides providing a high degree of reflectivity, such articles can also provide manufacturing flexibility. The metallic layers have smooth, reflective metal surfaces that can also be specular surfaces. As used herein, "specular surfaces" refer to surfaces that induce a mirror-like reflection of light in which the direction of incoming light and the direction of outgoing light form the same angle with respect to the surface normal. Any reflective metal may be used for this purpose, although suitable metals include silver, gold, aluminum, copper, nickel, and titanium. Of these, silver, aluminum and gold are particularly desirable.

Optionally, one or more layers can also be added to alleviate the effects of corrosion on the reflective article. For example, a copper layer may be deposited onto the back side of a silver layer for use as a sacrificial anode to reduce corrosion of adjacent metallic layers.

A metallic layer can be deposited on the base layer using a variety of methods. Examples of suitable deposition techniques include physical vapor deposition via sputter coating, evaporation via e-beam or thermal methods, ion-assisted e-beam evaporation and combinations thereof. Metallic or ceramic mask or shuttering features may be used to limit the deposition to certain areas if so desired.

One particularly suitable deposition technique for forming metallic layers is physical vapor deposition (PVD) by sputtering. In this technique, atoms of the target are ejected by high-energy particle bombardment so that they can impinge onto a substrate to form a thin film. The high-energy particles used in sputter-deposition are generated by a glow discharge, or a self-sustaining plasma created by applying, for example, an electromagnetic field to argon gas.

In one exemplary method, the deposition process continues for a sufficient duration to build up a suitable layer thickness of the metallic layer on the base layer, thereby forming the metallic layer. As another option, other metals besides silver may be used. For example, metallic layers composed of a different metal may be similarly deposited by using a suitable target composed of that metal.

The metallic layer need not extend across the entire second surface of the base layer. In some especially desirable embodiments, the metallic layer comprises elemental silver. Optionally, a second metallic layer contacts and extends across the first metallic layer. In exemplary embodiments, the second metallic layer comprises elemental copper. Use of a copper layer that acts as a sacrificial anode can provide a reflective article with enhanced corrosion-resistance and outdoor weatherability. As another approach, a relatively inert metal alloy such as Inconel (an iron-nickel alloy) can also be used to enhance corrosion resistance.

The reflective metal layer is generally thick enough to provide the desired reflectivity. The desired thickness can vary depending on the composition of the metallic layer. For example, the metallic layer typically is at least about 75 nanometers to about 100 nanometers thick for metals such as silver, aluminum, and gold, and generally at least about 20 nanometers or at least about 30 nanometers thick for metals such as copper, nickel, and titanium. If multiple layers of metal are used, typically one or both of the metallic layers have a thickness of at least 25 nanometers, at least 50 nanometers, at least 75 nanometers, at least 90 nanometers, or at least 100 nanometers. Additionally, in some embodiments, one or both of the metallic layers have a thickness no greater than 100 nanometers, no greater than 110 nanometers, no greater than 125 nanometers, no greater than 150 nanometers, no greater than 200 nanometers, no greater than 300 nanometers, no greater than 400 nanometers, or no greater than 500 nanometers.

The method for preparing an edge-sealed article includes the application of a sealant composition. The sealant composition comprises at least one solvent capable of softening, penetrating or dissolving the at least one polymeric film layer of the multi-layer film article. Generally, the sealant composition also comprises at least one polymer dissolved in the solvent.

The sealant composition may be applied using any of wide variety of common solvent application techniques. Examples of suitable application techniques include, but are not limited to, brush coating, roll coating, spray coating, dip coating, and a variety of printing techniques including inkjet printing and screen printing. The techniques may involve the use of very simple equipment such as brushes, spray bottles, etc or more elaborate equipment such as printing or coating equipment. The choice of application technique will depend upon where the application is done (factory setting or at the worksite), the viscosity of the coating composition, the desired use for the edge-sealed article, as well as other factors.

A wide variety of solvents can be chosen for use in the sealant composition. Typically a single solvent is used, but a mixture of solvents can be used if desired. Generally, it is desirable that the solvent be sufficiently volatile to be able to dry under ambient conditions. While elevated temperatures can be used to accelerate the solvent drying, through the use of, for example ovens, heat guns, IR lamps, and the like, it is generally desirable that the sealant composition dry under ambient conditions. This is particularly true when the edge-sealed articles are prepared at a job site where such drying techniques are inconvenient or not possible. Also, it is generally desirable that the solvent dry under ambient conditions in a reasonable time. This time should not be so short that it is difficult for a user to apply the desired amount of sealant composition before the solvent dries so that the user is able to detect regions where the sealant composition has been applied. In other words, it is generally desirable for the user to see which regions are still "wet" while applying the sealant composition so as to avoid missing spots or over-applying the sealant composition. On the other hand it is also generally desirable that the time required for the solvent to dry not be too long, since it may be necessary to wait until at least partial dryness is achieved before handling or carrying out additional process steps with the edge-sealed article. Additionally, it may be desirable for in some instances to wait for complete dryness of the sealant composition in order to inspect the multi-layer article edge to ensure complete edge sealing. Typically it is desirable for the sealant composition to be at least partially dry within one hour after application. While not wishing to be bound by theory, it is believed that solvents that have a boiling point in the range of 40° C. to 150° C. are generally suitable.

Examples of suitable solvents include ketones, alcohols, halocarbons, hydrocarbons, aromatics and esters. Suitable ketones include acetone, methyl ethyl ketone (MEK), diethyl ketone, and combinations thereof. Suitable alcohols include simple alcohols such as methanol, ethanol, isopropanol, n-butanol, as well as hydrophilic glycol ethers such as those available from Dow Chemical, Midland, Mich. under the trade name "DOWANOL", for example, 1-methoxy-2-propanol available as "DOWANOL PM". Suitable halocarbons include chloroform and methylene chloride, as well as perfluorinated ethers such as those commercially available from 3M Company, St. Paul, Minn., under the trade designations "FC-72", "FC-75", and "FC-77". Suitable hydrocarbons include hexanes, heptanes, and petroleum ether. Suitable aromatics include toluene and benzene. Suitable esters include ethyl acetate and butyl acetate. Particularly suitable solvents include acetone, MEK, and DOWANOL PM. The ketone MEK in some embodiments gives a particularly suitable balance of properties such as penetration of the polymer(s) on the edge and drying time.

The sealant composition may also comprise at least one polymer dissolved in the solvent. Typically, the polymer comprises a fluoropolymer, a non-tacky at ambient temperatures (meth)acrylate-based block copolymer, or a combination thereof. Suitable fluoropolymers include virtually any fluoropolymer that is soluble in the solvent of the sealant composition. The fluoropolymer may be a fluoroplastic polymer or a fluoroelastomeric polymer. One suitable class of fluoroplastic polymers are copolymers of tetrafluoroethylene, hexafluoropropylene and vinylidene fluouride, such as, for example, the polymers commercially available from 3M Company, St. Paul, Minn., under the trade name "DYNEON THV". A particularly suitable copolymer is "DYNEON THV 221 GZ". Further useful examples include, but are not limited to, the polymers commercially available from 3M Company, St. Paul, Minn., under the trade name "DYNEON PVDF", amorphous fluoropolymers such as those commercially available from DuPont under the trade designation "TEFLON AF", perfluoroelastomers, and curable fluoroelastomers such as copolymers of hexafluoropropylene and vinylidene fluoride with curatives added.

In some embodiments, the sealant composition comprises a non-tacky at ambient temperatures (meth)acrylate-based block copolymer. Typically, the (meth)acrylate-based block copolymers are ABA triblock or (AB)$_n$ star block copolymers, more typically triblock copolymers. Generally, the A blocks are more rigid than the B block. That is, the A blocks have a higher glass transition temperature and have a higher hardness than that of the B block. The B block is commonly referred to as a soft block while the A blocks are referred to as hard blocks. Typically, the A blocks have a glass transition temperature of at least 50° C. and the B block has a glass transition temperature no greater than 20° C. In exemplary block copolymers, the A blocks have a Tg of at least 60° C., at least 80° C., at least 100° C., or at least 120° C. while the B block has a glass transition temperature no greater than 10° C., no greater than 0° C., no greater than −5° C., or no greater than −10° C.

In some embodiments, the A block component is a thermoplastic material while the B block component is an elastomeric material. As used herein, the term "thermoplastic" refers to a polymeric material that flows when heated and that returns to its original state when cooled back to room temperature. As used herein, the term "elastomeric" refers to a polymeric material that can be stretched to at least twice its original length and then retracted to approximately its original length upon release.

The solubility parameter of the A blocks is generally substantially different from the solubility parameter of the B block. Stated differently, the A blocks are typically not compatible or miscible with the B block, and this generally results in localized phase separation, or "microphase separation", of the A and B blocks. Microphase separation can advantageously impart elastomeric properties and dimensional stability to a block copolymer material.

In some embodiments, the block copolymer has a multi-phase morphology, at least at temperatures in the range of about 20° C. to 150° C. The block copolymer can have distinct regions of reinforcing A block domains (e.g., nanodomains) in a matrix of the softer, elastomeric B block. For example, the block copolymer can have a discrete, discontinuous A block phase in a substantially continuous B block phase. In some such examples, the concentration of A block polymeric units is no greater than about 35 weight percent of the block copolymer. The A blocks usually provide the structural and cohesive strength for the block copolymer.

The monoethylenically unsaturated monomers that are suitable for the A block polymeric units generally have a Tg of at least 50° C. when reacted to form a homopolymer. In many examples, suitable monomers for the A block polymeric units have a Tg of at least 60° C., at least ° C., at least 100° C., or at least 120° C. when reacted to form a homopolymer. The Tg of these homopolymers can be up to 200° C. or up to 150° C. The Tg of these homopolymers can be, for example, in the range of 50° C. to 200° C., 50° C. to 150° C., 60° C. to 150° C., 80° C. to 150° C., or 100° C. to 150° C. In addition to these monomers having a Tg of at least 50° C. when reacted to form a homopolymer, other monomers can be optionally included in the A block while the Tg of the A block remains at least 50° C.

The A block polymeric units may be derived from methacrylate monomers, styrenic monomers, or a mixture thereof. That is, the A block polymeric units may be the reaction product of a monoethylenically unsaturated monomer that is selected from a methacrylate monomer, styrenic monomer, or mixture thereof.

As used herein to describe the monomers used to form the A block polymeric units, the term "mixture thereof" means that more than one type of monomer (e.g., a methacrylate and styrene) or more than one of the same type of monomer (e.g., two different methacrylates) can be mixed. The at least two A blocks in the block copolymer can be the same or different. In many block copolymers all of the A block polymeric units are derived from the same monomer or monomer mixture.

In some embodiments, methacrylate monomers are reacted to form the A blocks. That is, the A blocks are derived from methacrylate monomers. Various combinations of methacrylate monomers may be used to provide an A block having a Tg of at least 50° C. The methacrylate monomers can be, for example, alkyl methacrylates, aryl methacrylates, or aralkyl methacrylates of Formula (I).

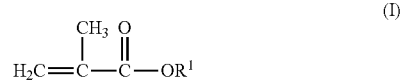

(I)

In Formula (I), $R^1$ is an alkyl, aryl, or aralkyl (i.e., an alkyl substituted with an aryl group).

Suitable alkyl groups often have 1 to 6 carbon atoms, 1 to 4 carbon atoms, or 1 to 3 carbon atoms. When the alkyl group has more than 2 carbon atoms, the alkyl group can be branched or cyclic. Suitable aryl groups often have 6 to 12 carbon atoms. Suitable aralkyl groups often have 7 to 18 carbon atoms.

Exemplary alkyl methacrylates according to Formula (I) include, but are not limited to, methyl methacrylate, ethyl methacrylate, isopropyl methacrylate, isobutyl methacrylate, tert-butyl methacrylate, and cyclohexyl methacrylate. In addition to the monomers of Formula (I), isobornyl methacrylate can be used. Exemplary aryl(meth)acrylates according to Formula (I) include, but are not limited to, phenyl methacrylate. Exemplary aralkyl methacrylates according to Formula (I) include, but are not limited to, benzyl methacrylate and 2-phenoxyethyl methacrylate.

In other embodiments, the A block polymeric units are derived from styrenic monomers. Exemplary styrenic monomers that can be reacted to form the A blocks include, but are not limited to, styrene, alpha-methylstyrene, and various alkyl substituted styrenes such as 2-methylstyrene, 4-methylstyrene, ethylstyrene, tert-butylstyrene, isopropylstyrene, and dimethylstyrene.

In addition to the monomers described above for the A blocks, these polymeric units can be prepared using up to 5 weight percent of the polar monomer such as methacrylamide, N-alkyl methacrylamide, N,N-dialkyl methacrylamide, or hydroxyalkyl methacrylate. These polar monomers can be used, for example, to adjust the cohesive strength of the A block and the glass transition temperature. Generally, the Tg of each A block remains at least 50° C. even with the addition of the polar monomer. Polar groups resulting from the polar monomers in the A block can function as reactive sites for chemical or ionic crosslinking, if desired.

The A block polymeric units can be prepared using up to 4 weight percent, up to 3 weight percent, or up to 2 weight percent of the polar monomer. In many examples, however, the A block polymeric units are substantially free or free of a polar monomer.

As used herein, the term "substantially free" in reference to the polar monomer means that any polar monomer that is present is an impurity in one of the selected monomers used to form the A block polymeric units.

The amount of polar monomer is less than 1 weight percent, less than 0.5 weight percent, less than 0.2 weight percent, or less than 0.1 weight percent of the monomers in the reaction mixture used to form the A block polymeric units.

The A block polymeric units are often homopolymers. In exemplary A blocks, the polymeric units are derived from an alkyl methacrylate monomers with the alkyl group having 1 to 6, 1 to 4, 1 to 3, 1 to 2, or 1 carbon atom. In some more specific examples, the A block polymeric units are derived from methyl methacrylate (i.e., the A blocks are poly(methyl methacrylate)).

The monoethylenically unsaturated monomers that are suitable for use in the B block polymeric unit usually have a Tg no greater than 20° C. when reacted to form a homopolymer. In many examples, suitable monomers for the B block polymeric unit have a Tg no greater than 10° C., no greater than 0° C., no greater than −5° C., or no greater than −10° C. when reacted to form a homopolymer.

The Tg of these homopolymers is often at least −80° C., at least −70° C., at least −60° C., or at least −50° C. The Tg of these homopolymers can be, for example, in the range of −80° C. to 20° C., −70° C. to 10° C., −60° C. to 0° C., or −60° C. to −10° C. In addition to these monomers having a Tg no greater than 20° C. when reacted to form a homopolymer, other monomers can be included in the B block while keeping the Tg of the B block no greater than 20° C.

The B midblock polymeric unit is typically derived from (meth)acrylate monomers, vinyl ester monomers, or a combination thereof. That is, the B midblock polymeric unit is the reaction product of a second monomer selected from (meth)acrylate monomers, vinyl ester monomers, or mixtures thereof. As used herein, the term "(meth)acrylate" refers to both methacrylate and acrylate. More than one type of monomer (e.g., a (meth)acrylate and a vinyl ester) or more than one of the same type of monomer (e.g., two different (meth)acrylates) can be combined to form the B midblock polymeric unit.

In many embodiments, acrylate monomers, particularly alkyl acrylate or heteroalkyl acrylate monomers, are reacted to form the B block. More typically, alkyl acrylate monomers are used.

The B blocks are often derived from acrylate monomers of Formula (II).

(II)

In Formula (II), $R^2$ is an alkyl with 1 to 22 carbons or a heteroalkyl with 2 to 20 carbons and 1 to 6 heteroatoms selected from oxygen or sulfur.

The alkyl or heteroalkyl group can be linear, branched, cyclic, or a combination thereof. Exemplary alkyl acrylates of Formula (II) that can be used to form the B block polymeric unit include, but are not limited to, ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, isooctyl acrylate, isononyl acrylate, decyl acrylate, isodecyl acrylate, lauryl acrylate, isotridecyl acrylate, octadecyl acrylate, and dodecyl acrylate. Exemplary heteroalkyl acrylates of Formula (II) that can be used to form the B block polymeric unit include, but are not limited to, 2-methoxyethyl acrylate and 2-ethoxy ethyl acrylate.

Some alkyl methacrylates can be used to prepare the B blocks such as alkyl methacrylates having an alkyl group with greater than 6 to 20 carbon atoms. Exemplary alkyl methacrylates include, but are not limited to, 2-ethylhexyl methacrylate, isooctyl methacrylate, n-octyl methacrylate, isodecyl methacrylate, and lauryl methacrylate. Likewise, some heteroalkyl methacrylates such as 2-ethoxy ethyl methacrylate can also be used.

Polymeric units suitable for the B block can be prepared from monomers according to Formula (II). (Meth)acrylate monomers that are commercially unavailable or that cannot be polymerized directly can be provided through an esterification or trans-esterification reaction. For example, a (meth)acrylate that is commercially available can be hydrolyzed and then esterified with an alcohol to provide the (meth)acrylate of interest. Alternatively, a higher alkyl (meth)acrylate can be derived from a lower alkyl(meth) acrylate by direct trans-esterification of the lower alkyl (meth)acrylate with a higher alkyl alcohol.

In still other embodiments, the B block polymeric unit is derived from vinyl ester monomers. Exemplary vinyl esters include, but are not limited to, vinyl acetate, vinyl 2-ethylhexanoate, and vinyl neodecanoate.

In addition to the monomers described above for the B block, this polymeric unit can be prepared using up to 5 weight percent of the polar monomer such as acrylamide, N-alkyl acrylamide (e.g., N-methyl acrylamide), N,N-dialkyl acrylamide (N,N-dimethyl acrylamide), or hydroxyalkyl acrylate. These polar monomers can be used, for example, to adjust the glass transition temperature, while keeping the Tg of the B block less than 20° C. Additionally, these polar monomers can result in polar groups within the polymeric units that can function as reactive sites for chemical or ionic crosslinking, if desired.

The polymeric units can be prepared using up to 4 weight percent, up to 3 weight percent, up to 2 weight percent of the polar monomer. In other embodiments, the B block polymeric unit is free or substantially free of a polar monomer. As used herein, the term "substantially free" in reference to the polar monomer means that any polar monomer that is present is an impurity in one of the selected monomers used to form the B block polymeric unit.

Generally, the amount of polar monomer is less than 1 weight percent, less than 0.5 weight percent, less than 0.2 weight percent, or less than 0.1 weight percent of the monomers used to form the B block polymeric units.

The B block polymeric unit may be a homopolymer. In some examples of the B block, the polymeric unit can be derived from an alkyl acrylate having an alkyl group with 1 to 22, 2 to 20, 3 to 20, 4 to 20, 4 to 18, 4 to 10, or 4 to 6 carbon atoms. Acrylate monomers such as alkyl acrylate monomers form homopolymers that are generally less rigid than those derived from their alkyl methacrylate counterparts.

The composition and respective Tg of the A and B blocks provides for a non-tacky block copolymer. Being non-tacky is advantageous not only because it is easy to handle and manipulate, but also because the block copolymer forms a sealant layer on the outer surface of the multi-layer article. A tacky sealant layer is not desirable because it would be prone to picking up dirt and soil and be difficult to handle.

In some sealant compositions, the block copolymer is an ABA triblock (meth)acrylate block copolymer with an A block polymeric unit derived from a methacrylate monomer and a B block polymeric unit derived from an acrylate monomer. For example, the A block polymeric units can be derived from an alkyl methacrylate monomer and the B block polymer unit can be derived from an alkyl acrylate monomer.

In some more specific examples, the A blocks are derived from an alkyl methacrylate with an alkyl group having 1 to 6, 1 to 4, 1 to 3, or 1 to 2 carbon atoms and the B block is derived from an alkyl acrylate with an alkyl group having 3 to 20, 4 to 20, 4 to 18, 4 to 10, 4 to 6, or 4 carbon atoms. For example, the A blocks can be derived from methyl methacrylate and the B block can be derived from an alkyl acrylate with an alkyl group having 4 to 10, 4 to 6, or 4 carbon atoms.

In a more specific example, the A blocks can be derived from methyl methacrylate and the B block can be derived from n-butyl acrylate. That is, the A blocks are poly methylmethacrylate and the B block is poly n-butylacrylate.

Optionally, the weight percent of the B block equals or exceeds the weight percent of the A blocks in the block copolymer. Assuming that the A block is a hard block and the B block is a soft block, higher amounts of the A block tend to increase the modulus of the block copolymer. If the amount of the A block is too high, however, the morphology of the block copolymer may be inverted from the desirable arrangement where the B block forms a continuous phase and the block copolymer is an elastomeric material. That is, if the amount of the A block is too high, the copolymer tends to have properties more similar to a thermoplastic material than to an elastomeric material.

Typically, the block copolymer contains 10 to 50 weight percent of the A block polymeric units and 50 to 90 weight percent of the B block polymeric units. For example, the block copolymer can contain 10 to 40 weight percent of the A block polymeric units and 60 to 90 weight percent of the B block polymeric units, 10 to 35 weight percent of the A block polymeric units and 65 to 90 weight percent of the B block polymeric units, 15 to 50 weight percent of the A block polymeric units and 50 to 85 weight percent of the B block polymeric units, 15 to 35 weight percent of the A block polymeric units and 65 to 85 weight percent of the B block polymeric units, 10 to 30 weight percent of the A block polymeric units and 70 to 90 weight percent of the B block polymeric units, 15 to 30 weight percent of the A block polymeric units and 70 to 85 weight percent of the B block polymeric units, 15 to 25 weight percent of the A block polymeric units and 75 to 85 weight percent of the B block polymeric units, or 10 to 20 weight percent of the A block polymeric units and 80 to 90 weight percent of the B block polymeric units.

The block copolymers can have any suitable molecular weight. In some embodiments, the molecular weight of the block copolymer is at least 2,000 g/mole, at least 3,000 g/mole, at least 5,000 g/mole, at least 10,000 g/mole, at least 15,000 g/mole, at least 20,000 g/mole, at least 25,000 g/mole, at least 30,000 g/mole, at least 40,000 g/mole, or at least 50,000 g/mole. In some embodiments, the molecular weight of the block copolymer is no greater than 500,000 g/mole, no greater than 400,000 g/mole, no greater than 200,000 g/mole, no greater than 100,000 g/mole, no greater than 50,000 g/mole, or no greater than 30,000 g/mole.

For example, the molecular weight of the block copolymer can be in the range of 1,000 to 500,000 g/mole, in the range of 3,000 to 500,000 g/mole, in the range of 5,000 to 100,000 g/mole, in the range of 5,000 to 50,000 g/mole, or in the range of 5,000 to 30,000 g/mole.

The molecular weight is typically expressed as the weight average molecular weight. Any known technique can be used to prepare the block copolymers. In some methods of preparing the block copolymers, iniferters are used as described in European Patent No. EP 349 232 (Andrus et al.). However, for some applications, methods of preparing block copolymers that do not involve the use of iniferters may be desirable because iniferters tend to leave residues that can be problematic especially in photo-induced polymerization reactions.

For example, the presence of thiocarbamate, which is a commonly used iniferter, may cause the resulting block copolymer to be more susceptible to weather-induced degradation. The weather-induced degradation may result from the relatively weak carbon-sulfur link in the thiocarbamate residue. The presence of thiocarbamate can often be detected, for example, using elemental analysis or mass spectroscopy. Thus, in some applications, it is desirable that the block copolymer is prepared using other techniques that do not result in the formation of this weak carbon-sulfur link.

Some suitable methods of making the block copolymers are living polymerization methods. As used herein, the term "living polymerization" refers to polymerization techniques, process, or reactions in which propagating species do not undergo either termination or transfer. If additional monomer is added after 100 percent conversion, further polymerization can occur.

The molecular weight of the living polymer increases linearly as a function of conversion because the number of propagating species does not change. Living polymerization methods include, for example, living free radical polymerization techniques and living anionic polymerization techniques. Specific examples of living free radical polymerization reactions include atom transfer polymerization reactions and reversible addition-fragmentation chain transfer polymerization reactions.

Block copolymers prepared using living polymerization methods tend to have well-controlled blocks. As used herein, the term "well-controlled" in reference to the method of making the blocks and the block copolymers means that the block polymeric units have at least one of the following characteristics: controlled molecular weight, low polydispersity, well-defined blocks, or blocks having high purity. Some blocks and block copolymers have a well-controlled molecular weight that is close to the theoretical molecular weight.

The theoretical molecular weight refers to the calculated molecular weight based on the molar charge of monomers and initiators used to form each block. Well-controlled blocks and block copolymers often have a weight average molecular weight ($M_w$) that is about 0.8 to 1.2 times the theoretical molecular weight or about 0.9 to 1.1 times the theoretical molecular weight. As such, the molecular weight of the blocks and of the total block can be selected and prepared.

Some blocks and block copolymers have low polydispersity. As used herein, the term "polydispersity" is a measure of the molecular weight distribution and refers to the weight average molecular weight ($M_w$) divided by the number average molecular weight ($M_n$) of the polymer. Materials with the same molecular weight have a polydispersity of 1.0 while materials with multiple molecular weights have a polydispersity greater than 1.0. The polydispersity can be determined, for example, using gel permeation chromatography.

Well-controlled blocks and block copolymers often have a polydispersity of 2.0 or less, 1.5 or less, or 1.2 or less.

Some block copolymers have well-defined blocks. That is, the boundaries between the A blocks and the continuous phase containing the B blocks are well defined.

These well-defined blocks have boundaries that are essentially free of tapered structures.

As used herein, the term "tapered structure" refers to a structure derived from monomers used for both the A and B blocks.

Tapered structures can increase mixing of the A block phase and the B block phase leading to decreased overall cohesive strength of the block copolymer or base layer containing the block copolymer. Block copolymers made using methods such as living anionic polymerization tend to result in boundaries that are free or essentially free of tapered structures.

The distinct boundaries between the A blocks and the B block often results in the formation of physical crosslinks that can increase overall cohesive strength without the need for chemical crosslinks. In contrast to these well-defined blocks, some block copolymers prepared using iniferters have less distinct blocks with tapered structures.

Optionally, the A blocks and B blocks have high purity. For example, the A blocks can be essentially free or free of segments derived from monomers used for the preparation of the B blocks. Similarly, B blocks can be essentially free or free of segments derived from monomers used for the preparation of the A blocks.

Living polymerization techniques typically lead to more stereoregular block structures than blocks prepared using non-living or pseudo-living polymerization techniques (e.g., polymerization reactions that use iniferters). Stereoregularity, as evidenced by highly syndiotactic structures or isotactic structures, tends to result in well-controlled block structures and tends to influence the glass transition temperature of the block.

For example, syndiotactic poly methylmethacrylate (PMMA) synthesized using living polymerization techniques can have a glass transition temperature that is about 20° C. to about 25° C. higher than a comparable PMMA synthesized using conventional (i.e., non-living) polymerization techniques. Stereoregularity can be detected, for example, using nuclear magnetic resonance spectroscopy. Structures with greater than about 75 percent stereoregularity can often be obtained using living polymerization techniques.

When living polymerization techniques are used to form a block, the monomers are generally contacted with an initiator in the presence of an inert diluent (or solvent). The inert diluent can facilitate heat transfer and mixing of the initiator with the monomers. Although any suitable inert diluent can be used, saturated hydrocarbons, aromatic hydrocarbons, ethers, esters, ketones, or a combination thereof are often selected.

Exemplary diluents include, but are not limited to, saturated aliphatic and cycloaliphatic hydrocarbons such as hexane, octane, cyclohexane, and the like; aromatic hydrocarbons such as toluene; and aliphatic and cyclic ethers such as dimethyl ether, diethyl ether, tetrahydrofuran, and the like; esters such as ethyl acetate and butyl acetate; and ketones such as acetone, methyl ethyl ketone, and the like.

When the block copolymers are prepared using living anionic polymerization techniques, the simplified structure A-M represents the living A block where M is an initiator fragment selected from a Group I metal such as lithium, sodium, or potassium.

For example, the A block can be the polymerization reaction product of a first monomer composition that includes methacrylate monomers according to Formula (I). A second monomer composition that includes the monomers used to form the B block can be added to A-M resulting in the formation of the living diblock structure A-B-M. For example, the second monomer composition can include monomers according to Formula (II). The addition of another charge of the first monomer composition, which can include monomers according to Formula (I), and the subsequent elimination of the living anion site can result in the formation of triblock structure A-B-A. Alternatively, living diblock A-B-M structures can be coupled using difunctional or multifunctional coupling agents to form the triblock structure A-B-A copolymers or (A-B)$_n$ star block copolymers.

Any initiator known in the art for living anionic polymerization reactions can be used. Typical initiators include alkali metal hydrocarbons such as organo lithium compounds (e.g., ethyl lithium, n-propyl lithium, iso-propyl lithium, n-butyl lithium, sec-butyl lithium, tert-octyl lithium, n-decyl lithium, phenyl lithium, 2-naphthyl lithium, A-butylphenyl lithium, 4-phenylbutyl lithium, cyclohexyl lithium, and the like). Such initiators can be useful in the preparation of living A blocks or living B blocks.

For living anionic polymerization of (meth)acrylates, the reactivity of the anion can be tempered by the addition of complexing ligands selected from materials such as crown ethers, or lithium ethoxylates. Suitable difunctional initiators for living anionic polymerization reactions include, but are not limited to, 1,1,4,4-tetraphenyl-1,4-dilithiobutane; 1,1,4,4-tetraphenyl-1,4-dilithioisobutane; and naphthalene lithium, naphthalene sodium, naphthalene potassium, and homologues thereof.

Other suitable difunctional initiators include dilithium compounds such as those prepared by an addition reaction of an alkyl lithium with a divinyl compound. For example, an alkyl lithium can be reacted with 1,3-bis(1-phenylethenyl)benzene or m-diisopropenylbenzene.

For living anionic polymerization reactions, it is usually advisable to add the initiator in small quantities (e.g., a drop at a time) to the monomers until the persistence of the characteristic color associated with the anion of the initiator is observed. Then, the calculated amount of the initiator can be added to produce a polymer of the desired molecular weight. The preliminary addition of small quantities often destroys contaminants that react with the initiator and allows better control of the polymerization reaction.

The polymerization temperature used depends on the monomers being polymerized and on the type of polymerization technique used. Generally, the reaction can be carried out at a temperature of about −100° C. to about 150° C. For living anionic polymerization reactions, the temperature is often about −80° C. to about 20° C. For living free radical polymerization reactions, the temperature is often about 20° C. to about 150° C. Living free radical polymerization reactions tend to be less sensitive to temperature variations than living anionic polymerization reactions.

Methods of preparing block copolymers using living anionic polymerization methods are further described, for example, in U.S. Pat. No. 6,734,256 (Everaerts et al.), U.S. Pat. No. 7,084,209 (Everaerts et al.), U.S. Pat. No. 6,806,320 (Everaerts et al.), and U.S. Pat. No. 7,255,920 (Everaerts et al.). This polymerization method is further described, for example, in U.S. Pat. No. 6,630,554 (Hamada et al.) and U.S. Pat. No. 6,984,114 (Kato et al.) as well as in Japanese Patent Application Kokai Publication Nos. Hei 11-302617 (Uchiumi et al.) and 11-323072 (Uchiumi et al.)

In general, the polymerization reaction is carried out under controlled conditions so as to exclude substances that can destroy the initiator or living anion. Typically, the polymerization reaction is carried out in an inert atmosphere such as nitrogen, argon, helium, or combinations thereof. When the reaction is a living anionic polymerization, anhydrous conditions may be necessary.

Suitable block copolymers can be purchased from Kuraray Co., LTD. (Tokyo, Japan) under the trade designation LA POLYMER. Some of these block copolymers are triblock copolymers with poly(methyl methacrylate) endblocks and a poly(n-butyl acrylate) midblock. In some embodiments, more than one block copolymer is included in the base layer composition. For example, multiple block copolymers with different weight average molecular weights or multiple block copolymers with different block compositions can be used.

In some embodiments it may be desirable for the sealant composition to comprise additional additives. Virtually any additive is suitable provided it does not interfere with the use of the sealing composition to seal the multi-layer article. Examples of suitable additives include ultraviolet light absorbers, antioxidants, hindered amine light stabilizers (HALS), surfactants, adhesion promoters, dispersants, hydrophobic or hydrophilic enhancing agents, pigments, fillers, opaquifying agents, and combinations thereof. In some embodiments, opaquifying agents may be particularly suitable additives if it is desirable to form an opaque layer around the sealed edge to prevent the penetration of light, including visible light. The desirability of forming an opaque protective layer in a multi-layer article is described, for example, in U.S. Patent Ser. No. 61/515,073 titled "Edge Protected Barrier Assemblies" filed Aug. 4, 2011.

The above described methods can be used to form a wide array of articles. These articles comprise a multi-layer substrate that is edge sealed. In some embodiments, the articles are the edge-sealed multi-layer substrates. In other embodiments, the edge-sealed multi-layer substrate is part of a larger assembly. For example, the multi-layer substrate may be used as a cover layer or component layer for a number of suitable articles including electronic devices and display devices.

Examples of suitable electronic devices, include, for example, solar devices like a photovoltaic cell. Accordingly, the present disclosure provides an assembly comprising a photovoltaic cell. Suitable photovoltaic cells include those that have been developed with a variety of materials each having a unique absorption spectra that converts solar energy into electricity. Examples of materials used to make photovoltaic cells and their solar light absorption band-edge wavelengths include: crystalline silicon single junction (about 400 nm to about 1150 nm), amorphous silicon single junction (about 300 nm to about 720 nm), ribbon silicon (about 350 nm to about 1150 nm), CIS (Copper Indium Selenide) (about 400 nm to about 1300 nm), CIGS (Copper Indium Gallium di-Selenide) (about 350 nm to about 1100 nm), CdTe (about 400 nm to about 895 nm), GaAs multi junction (about 350 nm to about 1750 nm). The shorter wavelength left absorption band edge of these semiconductor materials is typically between 300 nm and 400 nm. In specific embodiments, the electronic device is a CIGS cell.

In some embodiments, the solar device (e.g., the photovoltaic cell) to which the assembly is applied comprises a flexible film substrate, resulting in a flexible photovoltaic device.

Examples of information display devices include devices with a wide range of display area configurations including liquid crystal displays, plasma displays, front and rear projection displays, cathode ray tubes and signage. Such display area configurations can be employed in a variety of portable and non-portable information display devices including personal digital assistants, cell phones, touch-sensitive screens, wrist watches, car navigation systems, global positioning systems, depth finders, calculators, electronic books, CD or DVD players, projection television screens, computer monitors, notebook computer displays, instrument gauges, instrument panel covers, signage such as graphic displays (including indoor and outdoor graphics, bumper stickers, etc) reflective sheeting and the like.

Also disclosed is an alternative method for preparing an edge-sealed multi-layer article. These articles may include the types of multi-layer articles described above, but may also include multi-layer articles that do not contain at least one polymeric layer. In this method, a sealant composition is applied to the edge of a multi-layer substrate comprising at least one edge and is permitted to dry. In these embodiments, however, because the multi-layer substrate need not contain a polymeric layer, the solvent need not be able to soften, dissolve or penetrate a polymeric layer. If a polymeric layer is present in the multi-layer substrate, the solvent need not be able to soften, dissolve or penetrate the polymeric layer. Examples of suitable sealant compositions include those described above. In these embodiments, while not wishing to be bound by theory, it is believed that the sealant composition, because it has a relatively low viscosity, is able to flow into nooks and crannies within and between layers. Upon drying, a layer of polymeric material is thus deposited on and in the edge of the multi-layer substrate and therefore is able to form an edge seal. An advantage of this technique over more conventional techniques for providing an edge seal, such as applying a curable caulk, tape, hot melt coating, etc, is that this technique does not create the stresses within the multi-layer substrate that are more likely with the conventional techniques. This is particularly important with multi-layer substrates that contain fragile layers such as the reflective articles described above and below.

Also disclosed herein are articles that comprise a multi-layer substrate with at least one edge, where the multi-layer substrate comprises at least one transparent polymeric film layer, and at least one metallic layer and where the multi-layer substrate has at least one edge that is edge sealed. Depending upon the nature of the article, more than one edge may be edge sealed. In some embodiments, the edge comprises a perimeter edge, in other embodiments the edge comprises a formed edge as described above. For example, two edges may be edge sealed, three edges may be edge sealed or all edges may be edge sealed. This type of article can be prepared by the methods described above. In some embodiments, no sealant material is present in the sealed edge. This type of article can be prepared using the above described methods, where the sealant composition only comprises a solvent capable of softening, penetrating or dissolving the at least one polymeric film layer of the multi-layer substrate. In other embodiments, the edge seal comprises a layer of edge sealant material completely encompassing the edge. This type of article can be prepared using the above described methods, where the sealant composition comprises at least one polymer dissolved in the solvent capable of softening, penetrating or dissolving the at least one polymeric film layer of the multi-layer substrate.

The multi-layer substrate can be any of the multi-layer articles described above that contain at least one metallic layer. An example of such a multi-layer substrate is a multi-layer mirror film such as the reflective article described in the pending U.S. Patent Application Ser. No. 61/409,210 titled "Reflective Articles and Methods of Making Same" filed on Nov. 2, 2010. The reflective article comprises a base layer having a first and second surface, and a metallic layer extending across at least a portion of the second surface. The reflective article may also comprise a top layer comprising poly methylmethacrylate in contact with the first surface of the base layer, and may also comprise a tie layer comprising a metal oxide located between the base layer and the metallic layer.

The base layer is non-tacky at ambient temperatures and comprises a random copolymer or a block copolymer with at least two endblock polymeric units that are each derived from a first monoethylenically unsaturated monomer comprising a methacrylate, acrylate, styrene, or combination thereof, wherein each endblock has a glass transition temperature of at least 50° C., and at least one midblock polymeric unit that is derived from a second monoethylenically unsaturated monomer comprising a methacrylate, acrylate, vinyl ester, or combination thereof, wherein each midblock has a glass transition temperature no greater than 20° C. The base layer may also comprise additives such as a ultraviolet light absorber or a nanofiller to adjust the modulus of the base layer. Typically, the base layer has a thickness of at least 10 micrometers but no greater than 200 micrometers.

The reflective articles comprise one or more metallic layers. Besides providing a high degree of reflectivity, such articles can also provide manufacturing flexibility. The metallic layers have smooth, reflective metal surfaces that can also be specular surfaces. As used herein, "specular surfaces" refer to surfaces that induce a mirror-like reflection of light in which the direction of incoming light and the direction of outgoing light form the same angle with respect to the surface normal. Any reflective metal may be used for this purpose, although suitable metals include silver, gold, aluminum, copper, nickel, and titanium. Of these, silver, aluminum and gold are particularly desirable.

Optionally, one or more layers can also be added to alleviate the effects of corrosion on the reflective article. For example, a copper layer may be deposited onto the back side of a silver layer for use as a sacrificial anode to reduce corrosion of adjacent metallic layers.

A metallic layer can be deposited on the base layer using a variety of methods. Examples of suitable deposition techniques include physical vapor deposition via sputter coating, evaporation via e-beam or thermal methods, ion-assisted e-beam evaporation and combinations thereof. Metallic or ceramic mask or shuttering features may be used to limit the deposition to certain areas if so desired.

One particularly suitable deposition technique for forming metallic layers is physical vapor deposition (PVD) by sputtering. In this technique, atoms of the target are ejected by high-energy particle bombardment so that they can impinge onto a substrate to form a thin film. The high-energy particles used in sputter-deposition are generated by a glow discharge, or a self-sustaining plasma created by applying, for example, an electromagnetic field to argon gas.

In one exemplary method, the deposition process continues for a sufficient duration to build up a suitable layer thickness of the metallic layer on the base layer, thereby forming the metallic layer. As another option, other metals besides silver may be used. For example, metallic layers composed of a different metal may be similarly deposited by using a suitable target composed of that metal.

The metallic layer need not extend across the entire second surface of the base layer. In some especially desirable embodiments, the metallic layer comprises elemental silver. Optionally, a second metallic layer contacts and extends across the first metallic layer. In exemplary embodiments, the second metallic layer comprises elemental copper. Use of a copper layer that acts as a sacrificial anode can provide a reflective article with enhanced corrosion-resistance and outdoor weatherability. As another approach, a relatively inert metal alloy such as Inconel (an iron-nickel alloy) can also be used to enhance corrosion resistance.

The reflective metal layer is generally thick enough to provide the desired reflectivity. The desired thickness can vary depending on the composition of the metallic layer. For example, the metallic layer typically is at least about 75 nanometers to about 100 nanometers thick for metals such as silver, aluminum, and gold, and generally at least about 20 nanometers or at least about 30 nanometers thick for metals such as copper, nickel, and titanium. If multiple layers of metal are used, typically one or both of the metallic layers have a thickness of at least 25 nanometers, at least 50 nanometers, at least 75 nanometers, at least 90 nanometers, or at least 100 nanometers. Additionally, in some embodiments, one or both of the metallic layers have a thickness no greater than 100 nanometers, no greater than 110 nanometers, no greater than 125 nanometers, no greater than 150 nanometers, no greater than 200 nanometers, no greater than 300 nanometers, no greater than 400 nanometers, or no greater than 500 nanometers.

The reflective articles may also comprise a back plate, a front plate or a combination thereof. The back plate and/or front plate are typically rigid or semi-rigid plates. Front plates can be placed over the reflective surface to provide protection and are optically transparent. Examples of suitable front plates include glass plates and optically transparent plastic plates. The back plate is typically present to provide support and shape to the article. An example of a suitable back plate is a polymethylmethacrylate (PMMA) plate. Back plates will be described in greater detail below.

Typically the edge seal comprises a layer of edge sealant material completely encompassing the edge. This type of article can be prepared using the above described methods, where the sealant composition comprises at least one polymer dissolved in the solvent capable of softening, penetrating or dissolving the at least one polymeric film layer of the multi-layer substrate.

Examples of edge sealant materials include the fluorinated polymers, the non-tacky at ambient temperature (meth)acrylate-based block copolymers, and combinations thereof described above.

Figure 2:
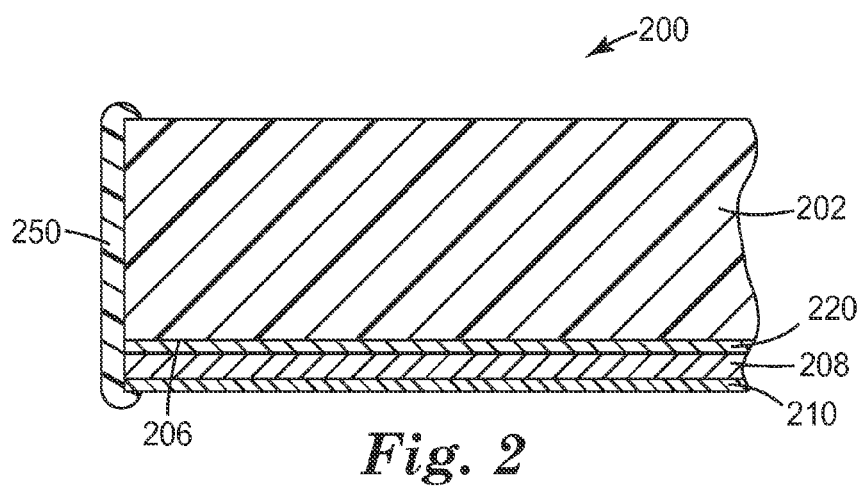
FIG. 2 shows a cross sectional view showing layers of a reflective article according to another embodiment of this disclosure.
Figure 3:
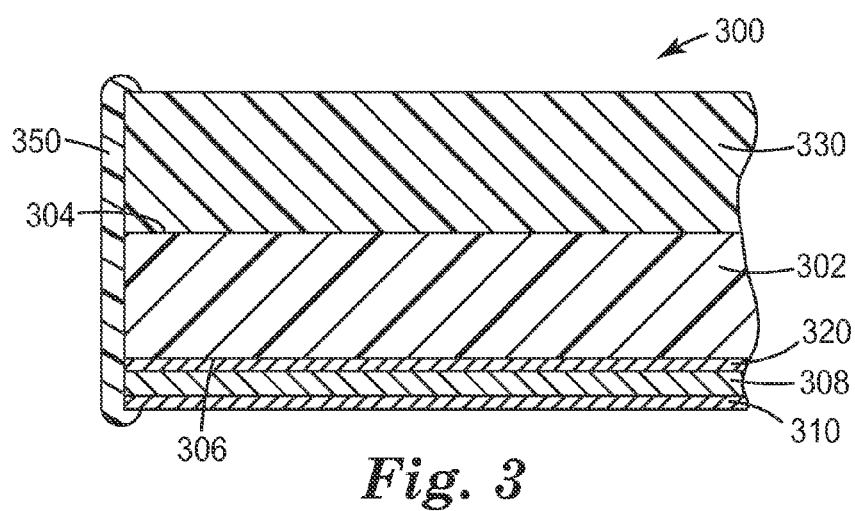
FIG. 3 shows a cross sectional view showing layers of a reflective article according to still another embodiment of this disclosure.

Illustrations of exemplary embodiments of reflective articles of this disclosure are shown in FIGS. 1-3. FIG. 1 shows reflective article 100. Reflective article 100 includes base layer 102 having a first surface 104 and second surface 106. In this embodiment, base layer 102 is non-tacky at ambient temperatures and comprises a random copolymer or a block copolymer as described above. The base layer 102 may alternatively comprise a block copolymer/homopolymer blend. For example, the base layer 102 may include an A-B-A triblock copolymer blended with a homopolymer that is soluble in either the A or B block. Optionally, the homopolymer has a polymeric unit identical to either the A or B block. The addition of one or more homopolymers to the block copolymer composition can be advantageously used either to plasticize or to harden one or both blocks. In some particularly suitable embodiments, the block copolymer contains a poly(methyl methacrylate) A block and a poly(butyl acrylate) B block, and is blended with a poly(methyl methacrylate) homopolymer. Particularly suitable non-tacky block copolymers include poly(methyl methacrylate)-poly(n-butyl acrylate)-poly(methyl methacrylate) (25:50:25) triblock copolymers as described above. The base layer 102 may also comprise additional additives such as, for example, ultraviolet light stabilizers or nanofillers to adjust the modulus of base layer 102. In some embodiments, the base layer 102 has a thickness of at least 10 micrometers, at least 50 micrometers, or at least 60 micrometers. Additionally, in some embodiments, the base layer 102 has a thickness no greater than 200 micrometers, no greater than 150 micrometers or no greater than 100 micrometers.

Extending across the second surface 106 of the base layer 102 is a metallic layer 108. In exemplary embodiments, the metallic layer 108 comprises elemental silver. As noted, however, other metals such as aluminum can also be used. Generally, the interface between the metallic layer 108 and the base layer 102 is sufficiently smooth that the metallic layer 108 provides a specular (mirrored) surface. The metallic layer 108 need not extend across the entire second surface 106 of the base layer 102. If desired, the base layer 102 can be masked during the deposition process such that the metallic layer 108 is applied onto only a pre-determined portion of the base layer 102. Patterned deposition of the metallic layer 108 onto the base layer 102 is also possible.

Optionally, and as shown in FIG. 1, a second metallic layer 110 contacts and extends across the first metallic layer 108. In exemplary embodiments, the second metallic layer 110 comprises elemental copper. Use of a copper layer that acts as a sacrificial anode can provide a reflective article with enhanced corrosion-resistance and outdoor weatherability. As another approach, a relatively inert metal alloy such as Inconel (an iron-nickel alloy) can also be used to enhance corrosion resistance.

The reflective metal layers are generally thick enough to reflect the desired amount of the solar spectrum of light. The thickness can vary depending on the composition of the metallic layers 108, and 110. For example, the metallic layers 108 and 110 are generally at least about 75 nanometers to about 100 nanometers thick for metals such as silver, aluminum, and gold, and generally at least about 20 nanometers or at least about 30 nanometers thick for metals such as copper, nickel, and titanium. In some embodiments, one or both of the metallic layers 108 and 110 have a thickness of at least 25 nanometers, at least 50 nanometers, at least 75 nanometers, at least 90 nanometers, or at least 100 nanometers. Additionally, in some embodiments, one or both of the metallic layers 108 and 110 have a thickness no greater than 100 nanometers, no greater than 110 nanometers, no greater than 125 nanometers, no greater than 150 nanometers, no greater than 200 nanometers, no greater than 300 nanometers, no greater than 400 nanometers, or no greater than 500 nanometers. As described previously, one or both of the metallic layers 108 and 110 can be deposited using any of a number of methods known in the art, including chemical vapor deposition, physical vapor deposition, and evaporation. Although not shown in the figures, three or more metallic layers may be used.

Optionally, but not shown in FIG. 1, the reflective article 100 can be adhered to a supporting substrate (or back plate) to impart a suitable shape to the reflective article 100. Article 100 can be adhered to a substrate using, for example, a suitable adhesive. In some embodiments, the adhesive is a pressure sensitive adhesive. As used herein, the term "pressure sensitive adhesive" refers to an adhesive that exhibits aggressive and persistent tack at room temperature, adhesion to a substrate with no more than finger pressure, sufficient ability to hold onto an adherend, and sufficient cohesive strength to be removable from the substrate. Suitable pressure sensitive adhesives include those described, for example, in PCT Publication No. WO 2009/146227 (Joseph, et al.).

Suitable substrates generally share certain characteristics. First, the substrate should be sufficiently smooth that texture in the substrate is not transmitted through the adhesive/metal/polymer stack. This, in turn, is advantageous because it: (1) allows for an optically accurate mirror, (2) maintains physical integrity of the metal by eliminating channels for ingress of reactive species that might corrode the metal or degrade the adhesive, and (3) provides controlled and defined stress concentrations within the reflective film-substrate stack. Second, the substrate is generally nonreactive with the reflective mirror stack to prevent corrosion. Third, the substrate generally has a surface to which the adhesive durably adheres. Exemplary substrates for reflective films, along with associated options and advantages, are described in PCT Publication Nos. WO04114419 (Schripsema), and WO03022578 (Johnston et al.); U.S. Publication Nos. 2010/0186336 (Valente, et al.) and 2009/0101195 (Reynolds, et al.); and U.S. Pat. No. 7,343,913 (Neidermeyer).

As a further option, the substrate may include a release surface to allow the reflective article 100 and pressure sensitive adhesive to be easily removed and transferred to another substrate. For example, the exposed surface of the metallic layer 110 in FIG. 1 may be coated with a pressure sensitive adhesive and the pressure sensitive adhesive temporarily secured to a silicone-coated release liner. Such a configuration can then be conveniently packaged for transport, storage, and consumer use.

The reflective article 100 further includes a layer of edge sealing material 150. This edge sealing layer 150 can be generated using any of the techniques described above. Typically, edge sealing layer 150 comprises a fluorinated polymer, a non-tacky at ambient temperature (meth)acrylate-based block copolymer, or a combination thereof as described above. If edge sealing layer 150 comprises a non-tacky at ambient temperature (meth)acrylate-based block copolymer, it may be the same material as layer 102, or it may be different.

FIG. 2 shows a reflective article, 200, according to another embodiment of this disclosure. Like the article 100, the article 200 has a base layer 202 and metallic layers 208, and 210 extending across a second surface 206 of the base layer 202, and edge sealing material layer 250. Unlike article 100, however, the article 200 includes a tie layer 220 interposed between the second surface 206 of the base layer 202 and a first surface of the uppermost metallic layer 208. In some embodiments, the tie layer 220 comprises a metal oxide such as aluminum oxide, copper oxide, titanium dioxide, silicon dioxide, or combinations thereof. As a tie layer 220, titanium dioxide has been found to provide surprisingly high resistance to delamination in dry peel and wet peel testing. Further options and advantages of metal oxide tie layers are described in U.S. Pat. No. 5,361,172 (Schissel et al.). Generally the tie layer 220 has an overall thickness of at least 0.1 nanometers, at least 0.25 nanometers, at least 0.5 nanometers, or at least 1 nanometer. It is also typical that the tie layer 220 has an overall thickness no greater than 2 nanometers, no greater than 5 nanometers, no greater than 7 nanometers, or no greater than 10 nanometers.

FIG. 3 shows a reflective article 300 according to yet another embodiment of this disclosure. Article 300 is similar to article 200 in that it includes a base layer 302, a tie layer 320 contacting and extending across the second surface 306 of the base layer 302, and successive metallic layers 308, and 310 extending across an opposing surface of the tie layer 320, and edge sealing material layer 350. Unlike the articles 100, and 200, however, the article 300 has a top layer 330 (back plate) contacting and extending across the first surface 304 of the base layer 302. Generally, the top layer 330 is a polymeric layer having high surface hardness, excellent light transmission and weatherability, such as a layer of poly(methyl methacrylate) or it may be a non-polymeric material such as glass. Optionally, the top layer 330 is laminated or solvent-cast onto the underlying base layer 302, or vice-versa.

The top layer 330 can have any thickness suitable for the particular application at hand. For solar reflective films, thicknesses ranging from 50 to 150 micrometers are desirable to provide both resistance to weathering and adequate mechanical flexibility. Also, like the base layer 102, the top layer 330 may be mixed with one or more nanofillers to adjust the properties of the top layer 330. The presence of a top layer 330 can enhance the strength of the overall article 300. With the top layer 330 providing structural support, the base layer 302 can be made quite thin, serving as an "organic tie layer" between the top layer 330 and the underlying layers 320, 308, and 310. In the configuration shown in FIG. 3, the base layer 302 generally has a thickness of at least 0.25 micrometers, at least 0.5 micrometers, at least 0.8 micrometers, at least 1 micrometer, at least 1.5 micrometers, or at least 2 micrometers. Typically, the base layer 302 has a thickness no greater than 4 micrometers, no greater than 5 micrometers, or no greater than 7 micrometers.

Other aspects of articles 200 and 300 are similar to those previously described for article 100 and shall not be repeated. Optionally, the articles 100, 200, and 300 can be part of an assembly in which the article 100, 200, or 300 is rigidly held by a suitable underlying support structure. For example, the article 100, 200, or 300 can be comprised in one of the many mirror panel assemblies described in co-pending and co-owned provisional U.S. Patent Application Ser. No. 61/239,265 (Cosgrove, et al.), filed on Sep. 2, 2009.

Also disclosed herein are articles that comprise a multi-layer substrate with at least one edge, where the multi-layer substrate comprises at least two transparent polymeric film layers, where the multi-layer substrate is edge-sealed by a layer of edge sealant material completely encompassing the edge. This type of article can be prepared using the above described methods, where the sealant composition comprises at least one polymer dissolved in the solvent capable of softening, penetrating or dissolving the at least one polymeric film layer of the multi-layer substrate.

The multi-layer substrate can be any of the multi-layer substrates described above that comprise at least two transparent polymeric film layers. Suitable examples include the multi-layer optical films and the barrier assembly films described above.

Particularly suitable multi-layer optical films include commercially available optical films marketed as VIKUITI Dual Brightness Enhanced Film (DBEF), VIKUITI Brightness Enhanced Film (BEF), VIKUITI Diffuse Reflective Polarizer Film (DRPF), VIKUITI Enhanced Specular Reflector (ESR), and VIKUITI Advanced Polarizing Film (APF), all available from 3M Company, St. Paul, Minn. Useful optical films are also described in U.S. Pat. Nos. 5,825,543; 5,828,488 (Ouderkirk et al); U.S. Pat. Nos.5,867, 316; 5,882,774; 6,179,948 B1 (Merrill et al); U.S. Pat. Nos. 6,352,761 B1; 6,368,699 B1; 6,927,900 B2; 6,827,886 (Neavin et al.); U.S. Pat. No. 6,972,813 B1 (Toyooka); U.S. Pat. No. 6,991,695; 2006/0084780 A1 (Hebrink et al.); 2006/0216524 A1; 2006/0226561 A1 (Merrill et al.); 2007/ 0047080 A1 (Stover et al.); WO 95/17303; WO 95/17691; WO95/17692; WO 95/17699; WO 96/19347; WO 97/01440; WO 99/36248; and WO99/36262. These multi-layer optical films are merely illustrative and are not meant to be an exhaustive list of suitable multi-layer optical films that can be used.

Particularly suitable barrier assembly films include those described in pending patent applications: U.S. Patent Ser. No. 61/515,021 titled "Edge Protected Barrier Assemblies" filed Aug. 4, 2011 and describes multi-layer films comprising a barrier stack adjacent an electronic device and a weatherable sheet adjacent the barrier stack; U.S. Patent Ser. No. 61/515,028 titled "Barrier Assemblies" filed Aug. 4, 2011 and describes multi-layer films comprising a barrier stack adjacent an electronic device and a weatherable sheet adjacent the barrier stack; U.S. Patent Ser. No. 61/515,043 titled "Edge Protected Barrier Assemblies" filed Aug. 4, 2011 and describes multi-layer films comprising a barrier stack adjacent an electronic device, a weatherable sheet adjacent the barrier stack, and a protective layer in contact with the electronic device and the weatherable sheet; and U.S. Patent Ser. No. 61/515,073 titled "Edge Protected Barrier Assemblies" filed Aug. 4, 2011 and describes multi-layer films comprising a barrier stack adjacent an electronic device, a weatherable sheet adjacent the barrier stack, and an opaque protective layer in contact with the electronic device and the weatherable sheet.

Examples of edge sealant materials include the fluorinated polymers, the non-tacky at ambient temperature (meth) acrylate-based block copolymers, and combinations thereof described above.

As with the reflective articles described above, the edge-sealed multi-layer film articles with at least two transparent polymeric films can be part of a larger assembly. Examples of suitable larger assemblies include electronic devices and display devices. Additionally, in some embodiments, especially embodiments involving larger assemblies, it may be desirable to form a second edge seal. The second edge seal can encompass the first edge seal and may additionally encompass other layers or articles. For example an edge-sealed multi-layer article may be used as a protective cover for the electronic or display device. The edge-sealed multi-layer article may be placed such that at least one edge of the electronic or display device is proximate to the sealed edge of the multi-layer article. An edge sealant composition can be applied to this newly formed edge and allowed to dry to form the second edge seal.

Examples of suitable electronic devices, include, for example, solar devices like a photovoltaic cell. Accordingly, the present disclosure provides an assembly comprising a photovoltaic cell. Suitable photovoltaic cells include those that have been developed with a variety of materials each having a unique absorption spectra that converts solar energy into electricity. Examples of materials used to make photovoltaic cells and their solar light absorption band-edge wavelengths include: crystalline silicon single junction (about 400 nm to about 1150 nm), amorphous silicon single junction (about 300 nm to about 720 nm), ribbon silicon (about 350 nm to about 1150 nm), CIS (Copper Indium Selenide) (about 400 nm to about 1300 nm), CIGS (Copper Indium Gallium di-Selenide) (about 350 nm to about 1100 nm), CdTe (about 400 nm to about 895 nm), GaAs multi junction (about 350 nm to about 1750 nm). The shorter wavelength left absorption band edge of these semiconductor materials is typically between 300 nm and 400 nm. In specific embodiments, the electronic device is a CIGS cell. In some embodiments, the solar device (e.g., the photovoltaic cell) to which the assembly is applied comprises a flexible film substrate, resulting in a flexible photovoltaic device.

Examples of information display devices include devices with a wide range of display area configurations including liquid crystal displays, plasma displays, front and rear projection displays, cathode ray tubes and signage. Such display area configurations can be employed in a variety of portable and non-portable information display devices including personal digital assistants, cell phones, touch-sensitive screens, wrist watches, car navigation systems, global positioning systems, depth finders, calculators, electronic books, CD or DVD players, projection television screens, computer monitors, notebook computer displays, instrument gauges, instrument panel covers, signage such as graphic displays (including indoor and outdoor graphics, bumper stickers, etc) reflective sheeting and the like.

This disclosure includes the following embodiments.

Among the embodiments are methods for preparing articles. A first embodiment includes a method of preparing article comprising: providing a multi-layer film article comprising at least one polymeric film layer and having an edge; providing a sealant composition, the sealant composition comprising at least one solvent capable of softening, penetrating or dissolving the at least one polymeric film layer of the multi-layer film article; applying the sealant composition to at least a portion of the of the edge of the multi-layer film article; and permitting the sealant composition to dry to form an edge-sealed article.

Embodiment 2 is the method of embodiment 1, wherein the sealant composition further comprises at least one polymer dissolved in the solvent.

Embodiment 3 is the method of embodiment 2, wherein the at least one polymer comprises a fluoropolymer, a non-tacky at ambient temperatures (meth)acrylate-based block copolymer, or a combination thereof.

Embodiment 4 is the method of embodiment 3, wherein the non-tacky at ambient temperatures (meth)acrylate block copolymer comprises at least two endblock polymeric unites that are each derived from a first monoethylenically unsaturated monomer comprising a methacrylate, acrylate, styrene, or combination thereof, and each endblock has a Tg of at least 50° C., and at least one midblock polymeric unit that is derived from a second monoethylenically unsaturated monomer comprising a methacrylate, acrylate, vinyl ester, or combination thereof and the midblock has a Tg of no greater than 20° C.

Embodiment 5 is the method of any of embodiments 1-4, wherein the sealant composition comprises additional additives comprising ultraviolet light absorbers, antioxidants, hindered amine light stabilizers (HALS), surfactants, adhesion promoters, dispersants, hydrophobic or hydrophilic enhancing agents, pigments, fillers, opaquifying agents, and combinations thereof.

Embodiment 6 is the method of any of embodiments 1-5, wherein the multi-layer film article comprises at least one metal layer.

Embodiment 7 is the method of any of embodiments 1-6, wherein the at least one solvent capable of softening, penetrating or dissolving the at least one polymeric film layer, is capable of softening, penetrating or dissolving at least two of the layers of the multi-layer article.

Embodiment 8 is the method of any of embodiments 1-7, wherein the solvent comprises a ketone, alcohol, halocarbon, hydrocarbon, aromatic, ester, or combination thereof.

Embodiment 9 is the method of any of embodiments 1-8, wherein the solvent comprises acetone, methyl ethyl ketone, 1-methoxy-2-propanol, or a combination thereof.

Embodiment 10 is the method of any of embodiments 1-9, wherein the solvent comprises a solvent with a boiling point in the range of 40° C. to 150° C.

Embodiment 11 is the method of any of embodiments 1-10, wherein the edge comprises a perimeter edge.

Embodiment 12 is the method of any of embodiments 1-10, wherein the edge comprises a cut, slit or hole formed in the multi-layer film article.

Embodiment 13 is the method of any of embodiments 1-12, further comprising the application of a solvent pre-treatment to at least a portion of the edge prior to application of the sealant composition.

Embodiment 14 is the method of embodiment 13, wherein the solvent pre-treatment comprises a ketone, alcohol, halocarbon, hydrocarbon, aromatic, ester, or combination thereof.

Embodiment 15 is the method of any of embodiments 1-14, further comprising applying a second sealant composition to the edge-sealed article, the second sealant composition comprising: at least one solvent; and at least one polymer dissolved in the solvent; and permitting the solvent of the second sealant composition to dry.

Among the embodiments are articles. Embodiment 16 includes an article comprising: a multi-layer substrate with at least one edge comprising: at least one transparent polymeric film layer; and at least one metallic layer, wherein at least a portion of the edge of the multi-layer substrate is edge sealed.

Embodiment 17 is the article of embodiment 16, wherein the edge seal comprises a layer of edge sealant material completely encompassing the edge.

Embodiment 18 is the article of embodiment 16 or 17, wherein the multi-layer substrate comprises a multi-layer mirror film, an electronic device, or a display device.

Embodiment 19 is the article of embodiment 17 or 18, wherein the layer of edge sealant material comprises a fluorinated polymer, a non-tacky at ambient temperature (meth)acrylate-based block copolymer, or a combination thereof.

Embodiment 20 is the article of embodiment 19, wherein the fluorinated polymer comprises a copolymer of tetrafluoroethylene, hexafluoropropylene and vinylidene fluouride.

Embodiment 21 is the article of embodiment 19, wherein the non-tacky at ambient temperature (meth)acrylate-based block copolymer comprises at least two endblock polymeric unites that are each derived from a first monoethylenically unsaturated monomer comprising a methacrylate, acrylate, styrene, or combination thereof, and each endblock has a Tg of at least 50° C., and at least one midblock polymeric unit that is derived from a second monoethylenically unsaturated monomer comprising a methacrylate, acrylate, vinyl ester, or combination thereof and the midblock has a Tg of no greater than 20° C.

Embodiment 22 is the article of any of embodiments 16-21, wherein the multi-layer substrate further comprises a layer of non-tacky at ambient temperature (meth)acrylate-based block copolymer between the transparent polymeric film layer and the metallic layer.

Embodiment 23 is the article of embodiment 22, further comprising a tie layer located between the metallic layer and the layer of non-tacky at ambient temperature (meth)acrylate-based block copolymer, the tie layer comprising a metal oxide.

Embodiment 24 is the article of any of embodiments 16-23, wherein the metallic layer comprises one or more metals selected from the group consisting of: silver, gold, aluminum, copper, nickel, and titanium.

Embodiment 25 is the article of any of embodiments 16-24, wherein the metallic layer has a thickness of 75 to 500 nanometers.

Embodiment 26 is the article of any of embodiments 16-25, wherein the multi-layer substrate further comprises a back plate, a front plate, or a combination thereof.

Embodiment 27 is the article of any of embodiments 16-26, wherein the article further comprises an electronic device, or a display device.

Embodiment 28 is the article of embodiment 27, wherein the electronic device or display device comprises at least one edge proximate to the sealed edge of the multi-layer substrate, and further comprising a second layer of edge sealant material fully encompassing the sealed edge of the multi-layer substrate and the at least one edge of the electronic device or display device.

Embodiment 29 includes an article comprising: a multi-layer substrate with at least one edge comprising: at least two transparent polymeric film layers, wherein the edge of the multi-layer substrate comprises a layer of edge sealant material completely encompassing the edge, wherein the edge sealant material comprises: a fluorinated polymer, a non-tacky at ambient temperature (meth)acrylate-based block copolymer, or a combination thereof.

Embodiment 30 is the article of embodiment 29, wherein the fluorinated polymer comprises a copolymer of tetrafluoroethylene, hexafluoropropylene and vinylidene fluouride.

Embodiment 31 is the article of embodiment 29, wherein the non-tacky at ambient temperature (meth)acrylate-based block copolymer comprises at least two endblock polymeric unites that are each derived from a first monoethylenically unsaturated monomer comprising a methacrylate, acrylate, styrene, or combination thereof, and each endblock has a Tg of at least 50° C., and at least one midblock polymeric unit that is derived from a second monoethylenically unsaturated monomer comprising a methacrylate, acrylate, vinyl ester, or combination thereof and the midblock has a Tg of no greater than 20° C.

Embodiment 32 is the article of any of embodiments 29-31, wherein the article further comprises an electronic device, or a display device.

Embodiment 33 is the article of embodiment 32, wherein the electronic device or display device comprises at least one edge proximate to the sealed edge of the multi-layer substrate, and further comprising a second layer of edge sealant material fully encompassing the sealed edge of the multi-layer substrate and the at least one edge of the electronic device or display device.

Embodiment 34 includes a method of preparing an article comprising: providing a multi-layer article having an edge; providing a sealant composition, the sealant composition comprising at least one solvent; and at least one polymer dissolved in the solvent, wherein the polymer comprises: a fluoropolymer, a non-tacky at ambient temperatures (meth)acrylate-based block copolymer, or a combination thereof; applying the sealant composition to at least a portion of the of the edge of the multi-layer article; and permitting the sealant composition to dry to form an edge-sealed article.

Embodiment 35 is the method of embodiment 34, wherein the sealant composition comprises additional additives comprising ultraviolet light absorbers, antioxidants, hindered amine light stabilizers (HALS), surfactants, adhesion promoters, dispersants, hydrophobic or hydrophilic enhancing agents, pigments, fillers, opaquifying agents, and combinations thereof.

Embodiment 36 is the method of embodiments 34 or 35, wherein the multi-layer article comprises at least one layer of polymeric film.

Embodiment 37 is the method of any of embodiments 34-36, wherein the solvent comprises a ketone, alcohol, halocarbon, hydrocarbon, aromatic, ester, or combination thereof.

Embodiment 38 is the method of any of embodiments 34-37, wherein the solvent comprises acetone, methyl ethyl ketone, 1-methoxy-2-propanol, or a combination thereof.

Embodiment 39 is the method of any of embodiments 34-38, wherein the solvent comprises a solvent with a boiling point in the range of 40° C. to 150° C.

Embodiment 40 is the method of any of embodiments 34-39, wherein the edge comprises a perimeter edge.

Embodiment 41 is the method of any of embodiments 34-39, wherein the edge comprises a cut, slit or hole formed in the multi-layer film article.

Embodiment 42 is the method of any of embodiments 34-41, further comprising the application of a solvent pre-treatment to at least a portion of the edge prior to application of the sealant composition.

Embodiment 43 is the method of embodiment 42, wherein the solvent pre-treatment comprises a ketone, alcohol, halocarbon, hydrocarbon, aromatic, ester, or combination thereof.

Embodiment 44 is the method of any of embodiments 34-42, further comprising applying a second sealant composition to the edge-sealed article, the second sealant composition comprising: at least one solvent; and at least one polymer dissolved in the solvent; and permitting the solvent of the second sealant composition to dry.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Material Table

| Formulation | Preparation method comments |
| --- | --- |
| Block copolymer A | A poly(methyl methacrylate)-poly(n-butyl acrylate)-poly(methyl methacrylate) triblock copolymer that is commercially available under the "KURARITY" brand name and the "LA POLYMER 4285" trade designation from Kuraray Co., LTD (Tokyo, Japan) with a weight average molecular weight of about 75000 grams/mole. This copolymer contains 51 weight percent poly(methyl methacrylate) and 49 weight percent poly(n-butyl acrylate). |
| Block copolymer B | A poly(methyl methacrylate)-poly(n-butyl acrylate)-poly(methyl methacrylate) triblock copolymer that is commercially available under the "KURARITY" brand name and the "LA POLYMER 2250" trade designation from Kuraray Co., LTD (Tokyo, Japan) with a weight average molecular weight of about 80,000 grams/mole. This copolymer contains 33 weight percent poly(methyl methacrylate) and 67 weight percent poly(n-butyl acrylate). |
| Fluoropolymer | Commercially available DYNEON THV 221 GZ from 3M Company, St. Paul, MN. |
| Metalized Mirror A | Metalized multi-layer polymeric mirror film commercially available under the trade designation "SMF-1100" from 3M Company, St. Paul, MN. |
| Metalized Mirror B | Metalized multi-layer polymeric mirror film described under "Metalized Mirror B Production". This mirror film contains an extra tie layer of "Block copolymer A". |
| Non-metalized Barrier A | Non-metalized multi-layer polymeric barrier laminate with an ethylenetetrafluoroethylene (ETFE) outer layer for flexible photovoltaic commercially available under the trade designation "UBF-9L" from 3M Company, St. Paul, MN. |
| Non-metalized Barrier B | Non-metalized multi-layer polymeric barrier laminate without ETFE outer layer for flexible photovoltaic commercially available under the trade designation "UBF-5S" from 3M Company, St. Paul, MN. |
| 1-methoxy-2-propanol | Commercially available under the trade designation "Dowanol PM" from Dow Chemical, Midland, MI. |

Metallized Mirror B Production

The top layer substrate was a conventional 3.5 mil (89 micrometer) poly(methyl methacrylate) (PMMA) film manufactured in-house by extrusion followed by biaxial stretching. The film was made from a resin designated as CP-80 (Plaskolite, Inc., Columbus, Ohio). The film also contained about 2.5% by weight of the UV stabilizer TINUVIN brand 1577 (Ciba, a Division of BASF Corporation, Florham Park, N.J.). This film was used as a substrate upon which the "Metalized Mirror B" was built.

A coating solution was prepared by dissolving the "Block copolymer A" in toluene at 12 wt % solids in a high shear mixer for several hours. A clear solution (by visual inspection) was achieved.

The PMMA substrate was coated with the "Block copolymer A"/toluene solution using a pilot scale Gravure coater with the ability to coat 30 cm (12 in) wide web rolls. The coater was equipped with automatic web handling and speed control electronics. The coater had a 3 m (10 ft) long high air circulation oven integrated for drying solvent out of coating online. Deposition speed was 0.9-1.5 m/min (3-5 ft/min) and the oven temperature was 70-80° C. Thickness was controlled by the choice of Gravure Roll and wt % of polymer in coating solutions. A Gravure coating roll with groove size of 25 micrometer (1 mil) and 16.4 $CBM/in^2$ was used to make a dry coating thickness of 0.5 to 1 micrometer.

The dried, coated specimen was then vapor coated in a high vacuum (low pressure) physical vapor deposition (PVD) coater in order to add the metallic layer and a $TiO_2$ tie layer. Up to six specimens were loaded at a time, in the rotating dome of the PVD coater, on six 12 inch (30.5 cm) diameter specimen holders, which were located near the edge of the dome and configured at 45 degree angles facing the point source. The point source had 4 pocket e-beam crucibles, each of 1.5 inch (3.8 cm) diameter. The specimens were loaded with the copolymer base layer facing toward the point deposition source. As is common for PVD coaters of this type, the coating dome was rotated on its central axis and each holder was also rotated on its individual central axis. This double rotation served to ensure uniform deposition of metal and metal oxides vapors from the hot point source.

Once the specimens were loaded, the coater was evacuated, first using a mechanical roughing pump and then using a cryogenic pump to reduce pressure to one millionth of a torr. At this pressure, the electron beam gun was turned on to pre-heat $TiO_2$ pellets in the first of the four crucibles. When an appropriate vapor pressure of $TiO_2$ was achieved, the shield between the heated crucible and the specimen holders was removed, allowing $TiO_2$ vapors to deposit on the rotating specimens. A 5 nm thick $TiO_2$ film was deposited, at the rate of 5 Angstroms/second, on the surface of the specimens. The rate of deposition and the thickness was measured using an INFICON brand crystal rate/thickness monitoring sensor and controller (Inficon, East Syracuse, N.Y.).

After depositing 5 nm of $TiO_2$, the shield was automatically inserted by the thickness monitoring system to completely stop vapors from reaching the specimens. Without breaking vacuum, the second crucible, holding 99.999% purity silver wire pieces, was moved in to place. The same procedure as that for $TiO_2$ deposition was repeated to deposit a 90 nm thick silver layer over the $TiO_2$ layer. Then a third crucible holding copper wire was moved into place, and a 30 nm thick copper layer was deposited over the silver layer. Finally, the coater was backfilled slowly with dry nitrogen, and the specimens were carefully removed.

Salt Spray Test Method

Samples were placed in a 1000 L salt spray chamber with sample holders that ensured samples were separated from each other and the entire surface area was exposed to salt fog/spray. The salt spray chamber settings (temperature, condensing fog, pH, and NaCl concentration of condensing fog) adhered to ASTM B117. Samples were exposed to "salt-spray" continuously and inspected daily for the first week and weekly afterwards. Salt spray results included the reported amount of hrs in the chamber and the visually observed sample defined as follows:

Failed—Sample tunneled (buckled) from one edge to other or lost most (>50%) of the reflective surface
Minor corrosion—About ¼ inch (0.64 centimeter) corrosion contained at one or 2 edges or corners
Moderate Corrosion—More than ¼ inch (0.64 centimeter) corrosion on more than 2 edges
Severe corrosion—Corrosion intruded more than 1 inch (2.54 centimeter) into the sample from all 4 sides Comparative Example C1

Commercial "Metalized Mirror A" was laminated to a 10 cm×10 cm (4 in×4 in) painted aluminum plate 0.32 cm (⅛ in) thick (commercially available from Nichols Aluminum, Houston, Tex.) by applying a 1 mil thick Pressure Sensitive Adhesive (PSA) layer to create an article for testing that closely simulates an actual solar concentrator. 10 cm×10 cm (4 in×4 in) aluminum plate (back sheet) was sheared from a large standard sheet stock and mirror film was trimmed using a sharp blade to fit on to the aluminum back sheet. No edge sealing was done. Salt spray test results are indicated in Table 1. After 24 hrs in the salt spray chamber the sample had a worm tunnel (buckling) that extended across the entire sample.

Comparative Example C2

A polymeric reflector film made as described under "Metalized Mirror B Production" was laminated to the painted aluminum plate as described in Comparative Example 1. No edge sealing was done. Salt spray test results are indicated in Table 1. After 24 hrs in the salt spray chamber the sample had a worm tunnel (buckling) that extended across the entire sample.

Example 1

Edge sealing formulation (sealant) was made by dissolving "Block copolymer A" in methyl ethyl ketone (MEK) in a glass beaker with magnetic stirring to create a 40 wt. % solids solution. Polymer was left stirring in MEK, on the magnetic stirrer, for several hrs to obtain a clear solution.

A test specimen as used in Comparative Example C2 laminated to the aluminum plate was dip coated by immersing all four edges into the sealant solution. To apply the sealant solution to the sample, a 13 cm (5 in) diameter, glass container was filled to a height 0.64 cm (0.25 in) with the sealant solution. One side of the aluminum plate was dipped into the solution and held perpendicular to the liquid surface in the container for approximately 30 sec. This ensured that entire edge including the aluminum back-plate was encapsulated by the sealant. The plate was maintained at a 90 degree angle to the bottom of the container in order for the sealant to coat the front, side and back of the mirror assembly evenly. After 30 seconds, the plate was removed from the solution and allowed to dry at 20° C. in a fume hood for 5 min. During the drying process the sample was placed on a holder in such a way that edge remained untouched until fully dried/cured. This process was repeated to dip coat second, third and fourth edges of the test samples. After all edges were dipped in the sealant solution, the sample was placed on the holder (with the edges remaining untouched) for 60 min to dry. Salt spray test results are indicated in Table 1.

Example 2

A test specimen as described in Example 1 that had shown edge corrosion at one of the corners during salt-spray testing was removed from the salt chamber and used for this "repair" example.

The sample was thoroughly washed using tap water to remove salt deposition that occurred during testing. The silver in the sample has corroded about ¼ inch (0.64 centimeter) in from the corner edge. This corrosion front propelled by stress-strain phenomenon between polymer and metal layer would keep moving into the sample until it would reach the opposite edge or another corrosion front where it can release the energy. In CSP (concentrated solar power) applications with mirror film, once corrosion starts there is no method available for stopping it from further ingress into the panel. Corrosion fronts starting at edge perimeter or at a point defect or at a slit/hole created in the mirror surface anywhere can be stopped as soon as detected using this method and formulation. If the mirror is repaired when the corrosion/tunneling/buckling front has just started to move from the edge in to the mirror, the large mirror panel can be saved at an insignificant loss of reflective surface area.

To repair corroded sample described above, a slit was made around the corroded area using a sharp knife. The knife was pushed into the mirror, from the polymer film side, all the way down to the surface of the aluminum plate. The corrosion front was completely isolated from the rest of the mirror by making this slit all around it. A small quantity of edge sealing formulation as described in the Example 1 was dropped onto the slit filling it completely with the edge sealant. Enough edge seal material was applied to not only fill the slit but deposit enough on top surface to seal the slit from all sides. The sample was dried in a chemical hood for one hr at 20° C. and then it was put back into the salt spray chamber. After 600 hrs of salt-spray testing on the repaired sample there was no growth in corrosion beyond the slit.

Example 3

For this Example, mirror samples as described in Comparative Example C1 were used for edge sealing and salt chamber testing. The edge sealing formulation was made and applied as described in Example 1. One of these samples showed no corrosion after 1500 hrs in the salt-spray chamber while the second sample showed minor corrosion due to edge seal breach at one of the corners Example 4

"Non-metalized Barrier A" and "Non-metalized Barrier B" were edge sealed with the edge sealant formulation of Example 1 as described in Example 1. The samples were not exposed to the salt spray test as they were not metalized and they are not susceptible to the corrosion effects that metalized films are and no visible effects were anticipated using the salt spray test. Thus no results are reported in Table 1. In both cases, upon visual inspection, intact edge seals were visible, having adhered well, and there was no sign of delamination.

Example 5

The substrates described in Example 1 were first dipped into acetone for 30 sec which was considered a "pretreatment" for the edge sealant formulation that was applied subsequently. The method of making the edge seal formulation and coating sample edges was as described in Example 1 except that the solid wt % of polymer was reduced to 20 wt % and the MEK solvent of Example 1 was replaced with acetone. Salt spray results are listed in the Table 1.

Example 6

Example 5 was repeated but without the acetone pretreatment step. The sample showed poorer edge protection as compared to Example 7 as indicated in Table 1.

Example 7

Example 5 was repeated except the pretreatment solvent was isopropanol (IPA), the edge sealing formulation solvent was 1-methoxy-2-propanol and "Block copolymer B" was used instead of "Block copolymer A".

Example 8

Example 7 was repeated except that no pretreatment was done before applying the edge sealant. Salt spray test results are indicated in Table 1.

Example 9

The edge sealing composition (sealant) was made by dissolving Fluoropolymer in methyl ethyl ketone (MEK) in a glass vessel, and stirred to form a clear solution. Additional MEK was added to produce a 20% by weight solid content solution. Two samples of commercial "Metalized Mirror A" substrate of 10 centimeters×10 centimeters (4 inches×4 inches) were edge sealed by dipping into the edge sealant composition as described for Example 1 above. Salt spray test results are indicated in Table 1.

TABLE 1

| Example | Resin Solvent | Resin (wt %) | Priming | Substrate | Salt-Spray Results (Hrs) |
| --- | --- | --- | --- | --- | --- |
| C1 | No | No | No | Metalized Mirror A | Failed (24) |
| C2 | No | No | No | Metalized Mirror B | Minor Edge Corrosion* (48) |
| EX1 | MEK | Block Copolymer A (40%) | No | Metalized Mirror B | No corrosion (1680) |
| EX2 | MEK | Block Copolymer A (40%) | No | Metalized Mirror B | No corrosion (1536) |
| EX3 | MEK | Block Copolymer A (40%) | No | Metalized Mirror A | No corrosion** (500) |
| EX5 | Acetone | Block Copolymer A (20%) | Acetone | Metalized Mirror B | Moderate Corrosion (672) |
| EX6 | Acetone | Block Copolymer A (20%) | No | Metalized Mirror B | Severe Corrosion and Buckling (672) |
| EX7 | MP | Block Copolymer B (20%) | IPA | Metalized Mirror B | Minor Edge Corrosion (312) |
| EX8 | MP | Block Copolymer A (20%) | No | Metalized Mirror B | Severe Corrosion and Delamination (144) |
| EX9 | MEK | Fluoropolymer (20%) | No | Metalized Mirror B | Moderate Corrosion (312) |

*All edges showed similar corrosion
**No corrosion at repaired edge

What is claimed is:

1. A method of preparing an article comprising:
    providing a multi-layer film article comprising at least one polymeric film layer and having an edge;
    providing a sealant composition, the sealant composition comprising
        at least one solvent capable of softening, penetrating or dissolving the at least one polymeric film layer of the multi-layer film article; and
        at least one polymer dissolved in the solvent;
    applying the sealant composition to at least a portion of the of the edge of the multi-layer film article; and
    permitting the sealant composition to dry to form an edge-sealed article, and wherein the method further comprises the application of a solvent pre-treatment to at least a portion of the edge prior to application of the sealant composition.

2. The method of claim 1, wherein the at least one polymer comprises a fluoropolymer, a non-tacky at ambient temperatures (meth)acrylate-based block copolymer, or a combination thereof.

3. The method of claim 2, wherein the non-tacky at ambient temperatures (meth)acrylate block copolymer comprises at least two endblock polymeric unites that are each derived from a first monoethylenically unsaturated monomer comprising a methacrylate, acrylate, styrene, or combination thereof, and each endblock has a Tg of at least 50° C., and at least one midblock polymeric unit that is derived from a second monoethylenically unsaturated monomer comprising a methacrylate, acrylate, vinyl ester, or combination thereof and the midblock has a Tg of no greater than 20° C.

4. The method of claim 1, wherein the sealant composition comprises additional additives comprising ultraviolet light absorbers, antioxidants, hindered amine light stabilizers (HALS), surfactants, adhesion promoters, dispersants, hydrophobic or hydrophilic enhancing agents, pigments, fillers, opaquifying agents, and combinations thereof.

5. The method of claim 1, wherein the multi-layer film article comprises at least one metal layer.

6. The method of claim 1, wherein the solvent comprises a ketone, alcohol, halocarbon, hydrocarbon, aromatic, ester, or combination thereof.

7. The method of claim 1, wherein the edge comprises a perimeter edge.

8. The method of claim 1, wherein the edge comprises a cut, slit or hole formed in the multi-layer film article.

9. The method of claim 1, further comprising applying a second sealant composition to the edge-sealed article, the second sealant composition comprising at least one solvent; and at least one polymer dissolved in the solvent; and permitting the solvent of the second sealant composition to dry.

* * * * *

UNITED STATES PATENT AND TRADEMARK OFFICE
CERTIFICATE OF CORRECTION

PATENT NO. : 9,804,305 B2
APPLICATION NO. : 14/375029
DATED : October 31, 2017
INVENTOR(S) : Rajesh Katare et al.

It is certified that error appears in the above-identified patent and that said Letters Patent is hereby corrected as shown below:

In the Specification

Column 2
Line 61-62, delete "of the of the" and insert -- of the --, therefor.

Column 5
Line 56-57, delete "calorimetry" and insert -- Calorimetry --, therefor.

Column 11-12
Line 57-67 [Column 11] Line 1-6 [Column 12], delete "Suitable fluoropolymers include virtually any fluoropolymer that is soluble in the solvent of the sealant composition. The fluoropolymer may be a fluoroplastic polymer or a fluoroelastomeric polymer. One suitable class of fluoroplastic polymers are copolymers of tetrafluoroethylene, hexafluoropropylene and vinylidene fluouride, such as, for example, the polymers commercially available from 3M Company, St. Paul, Minn., under the trade name "DYNEON THV". A particularly suitable copolymer is "DYNEON THV 221 GZ". Further useful examples include, but are not limited to, the polymers commercially available from 3M Company, St. Paul, Minn., under the trade name "DYNEON PVDF", amorphous fluoropolymers such as those commercially available from DuPont under the trade designation "TEFLON AF", perfluoroelastomers, and curable fluoroelastomers such as copolymers of hexafluoropropylene and vinylidene fluoride with curatives added." and insert the same on Column 11, Line 58, as a new paragraph.

Column 11
Line 62, delete "fluouride," and insert -- fluoride, --, therefor.

Column 13
Line 32, delete "3carbon" and insert -- 3 carbon --, therefor.

Column 28
Line 37, delete "of the of the" and insert -- of the --, therefor.

Signed and Sealed this
Sixteenth Day of April, 2019

Andrei Iancu
*Director of the United States Patent and Trademark Office*

CERTIFICATE OF CORRECTION (continued)
U.S. Pat. No. 9,804,305 B2

Column 29
Line 53, delete "fluouride." and insert -- fluoride. --, therefor.

Column 30
Line 38, delete "fluouride." and insert -- fluoride. --, therefor.

Column 30-31
Line 67 [Column 30] Line 1 [Column 31], delete "of the of the" and insert -- of the --, therefor.

Column 33
Line 54, after "sides" insert -- . --.

Column 35
Line 28, after "corners" insert -- . --.

In the Claims

Column 36
Line 57-58, in Claim 1, delete "of the of the" and insert -- of the --, therefor.

Column 37
Line 3, in Claim 3, delete "unites" and insert -- units --, therefor.